United States Patent
Vescovi et al.

(10) Patent No.: US 10,444,834 B2
(45) Date of Patent: Oct. 15, 2019

(54) DEVICES, METHODS, AND USER INTERFACES FOR A WEARABLE ELECTRONIC RING COMPUTING DEVICE

(71) Applicant: Apple Inc., Cupertino, CA (US)

(72) Inventors: Marcos Regis Vescovi, Santa Cruz, CA (US); Marcel van Os, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/676,576

(22) Filed: Apr. 1, 2015

(65) Prior Publication Data

US 2015/0277559 A1    Oct. 1, 2015

Related U.S. Application Data

(60) Provisional application No. 61/973,469, filed on Apr. 1, 2014.

(51) Int. Cl.
*G06F 3/01* (2006.01)
*G06F 3/023* (2006.01)
(Continued)

(52) U.S. Cl.
CPC .............. *G06F 3/014* (2013.01); *G06F 1/163* (2013.01); *G06F 1/1643* (2013.01); *G06F 3/016* (2013.01); *G06F 3/017* (2013.01); *G06F 3/0233* (2013.01); *G06F 3/0346* (2013.01); *G06F 3/0416* (2013.01); *G06F 3/04883* (2013.01); *G06F 3/167* (2013.01); *G06F 21/31* (2013.01); *G06F 2203/0381* (2013.01)

(58) Field of Classification Search
CPC .... G06F 3/0233; G06F 3/0346; G06F 3/0416; G06F 3/04883; G06F 3/167
See application file for complete search history.

(56) References Cited

U.S. PATENT DOCUMENTS

2002/0009972 A1* 1/2002 Amento ................. G06F 3/017
 455/66.1
2003/0142065 A1 7/2003 Pahlavan
(Continued)

FOREIGN PATENT DOCUMENTS

JP H 07271506 A 10/1995
JP H 0962293 A 3/1997
(Continued)

OTHER PUBLICATIONS

Tuna Cakmakli, Patent, dated Feb. 20, 2010, received in Turkish Patent Registration No. 2008/06243, Title: "Mobile Phone Hands-Free Support Apparatus", 12 pages.
(Continued)

*Primary Examiner* — Ryan A Lubit
(74) *Attorney, Agent, or Firm* — Morgan, Lewis & Bockius LLP

(57) ABSTRACT

A user controls an external electronic device with a finger-ring-mounted touchscreen that includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

58 Claims, 16 Drawing Sheets

(51) Int. Cl.
*G06F 3/0346* (2013.01)
*G06F 3/041* (2006.01)
*G06F 3/0488* (2013.01)
*G06F 3/16* (2006.01)
*G06F 1/16* (2006.01)
*G06F 21/31* (2013.01)

(56) References Cited

U.S. PATENT DOCUMENTS

| | | | |
|---|---|---|---|
| 2007/0226497 A1* | 9/2007 | Taylor | G06F 21/31 713/168 |
| 2011/0199389 A1* | 8/2011 | Lu | G06F 3/017 345/619 |
| 2012/0005059 A1* | 1/2012 | Buck | G06Q 40/04 705/37 |
| 2012/0028577 A1* | 2/2012 | Rodriguez | H04N 21/44008 455/41.1 |
| 2013/0127980 A1 | 5/2013 | Haddick et al. | |
| 2013/0312087 A1* | 11/2013 | Latzina | G06F 21/00 726/19 |
| 2013/0339028 A1 | 12/2013 | Rosner et al. | |
| 2014/0032933 A1* | 1/2014 | Smith | G06F 21/6209 713/193 |
| 2014/0129937 A1* | 5/2014 | Jarvinen | G06F 3/0487 715/716 |
| 2014/0156269 A1* | 6/2014 | Lee | G06F 1/3206 704/231 |
| 2015/0147968 A1* | 5/2015 | Friedman | G06F 3/017 455/41.2 |
| 2015/0169975 A1* | 6/2015 | Kienzle | G06K 9/34 382/189 |
| 2015/0373443 A1 | 12/2015 | Carroll | |
| 2016/0134737 A1* | 5/2016 | Pulletikurty | G06F 3/0227 715/735 |
| 2018/0262823 A1 | 9/2018 | Carroll | |

FOREIGN PATENT DOCUMENTS

| | | |
|---|---|---|
| JP | 2004515099 A | 5/2004 |
| JP | 2005032032 A | 2/2005 |
| JP | 2010537300 A | 12/2010 |
| JP | 2012503244 A | 2/2012 |
| JP | 2013521576 A | 6/2013 |
| JP | 2013541095 A | 11/2013 |
| WO | WO 2010/032223 A1 | 3/2010 |

OTHER PUBLICATIONS

Invitation to Pay Additional Fees, dated Jun. 11, 2015, received in International Patent Application No. PCT/US2015/023941, which corresponds with U.S. Appl. No. 14/676,576, 6 pages.
International Search Report and Written Opinion, dated Aug. 31, 2015, received in PCT/US2015/023941, which corresponds with U.S. Appl. No. 14/676,576, 14 pages.
Office Action, dated Sep. 11, 2017, received in Japanese Patent Application No. 2016-558762, which corresponds with U.S. Appl. No. 14/676,576, 8 pages.
Office Action, dated Oct. 23, 2018, received in Chinese Patent Application No. 201580018347.1, which corresponds with U.S. Appl. No. 14/676,576, 14 pages.
Office Action, dated Jun. 29, 2018, received in Japanese Patent Application No. 2016-558762, which corresponds with U.S. Appl. No. 14/676,576, 12 pages.
Notice of Allowance, dated Sep. 28, 2018, received in Korean Patent Application No. 2016-7027890, which corresponds with U.S. Appl. No. 14/676,576, 4 pages.
Patent, dated Dec. 20, 2018, received in Korean Patent Application No. 2016-7027890, which corresponds with U.S. Appl. No. 14/676,576, 3 pages.
Office Action, dated Jun. 17, 2019, received in Chinese Patent Application No. 201580018347.1, which corresponds with U.S. Appl. No. 14/676,576, 3 pages.
Patent, dated May 10, 2019, received in Japanese Patent Application No. 2016-558762, which corresponds with U.S. Appl. No. 14/676,576, 3 pages.

* cited by examiner

Figure 6A  Figure 6B

DEVICES, METHODS, AND USER INTERFACES FOR A WEARABLE ELECTRONIC RING COMPUTING DEVICE

CROSS-REFERENCE TO RELATED APPLICATIONS

This application claims priority to and the benefit of U.S. Provisional Patent Application Ser. No. 61/973,469, filed on Apr. 1, 2014, which is hereby incorporated herein by reference in its entirety.

TECHNICAL FIELD

The embodiments described herein relate generally to electronic devices with touch-sensitive surfaces, gesture sensors, and/or voice-input recognition, including but not limited to electronic devices wearable on a user's finger having touch-sensitive display surfaces, gesture sensors, and/or microphones.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Use of existing touchpads and touch-screen displays, however, may be cumbersome, inconvenient, or inefficient for certain tasks and applications. A user's hands may be preoccupied with another task, for example, or the user's hands and/or arms may become fatigued after holding the device in a viewing position for extended periods of time. The light emitted by a touchscreen may be inappropriate in certain social environments or even dangerous if it gives away the position of a threatened user. Furthermore, switching back-and-forth between different input modes, such as a keyboard and mouse, may be inefficient. A need therefore exists for a more discreet, safer, more efficient, or more ergonomic way to interact with touch pads or touch screens.

SUMMARY

Accordingly, there is a need for electronic devices with faster, more efficient methods and interfaces for interacting and/or controlling external electronic devices. Such methods and interfaces optionally complement or replace conventional methods for interaction. Such methods and interfaces reduce the cognitive burden on a user and produce a more efficient human-machine interface. With respect to battery-operated devices, such methods and interfaces conserve power and increase the time between battery charges.

In some implementations, a wearable ring device includes an annular member defining an aperture therethrough that is sized for receipt therein of a first finger of a user, a computer processor housed in the annular member, a touchscreen electrically connected to the computer processor and disposed at least partially at an outer peripheral surface of the annular member, wherein the touchscreen is configured to receive input from a second finger of the user, a wireless transceiver electrically connected to the computer processor and configured to communicate with at least one external electronic device, and a rechargeable power source for supplying power to the touchscreen, wireless transceiver, and computer processor. In some embodiments, the wearable ring device further includes a microphone electrically connected to the computer processor for recognizing a voice command of the user; the microphone is configured to activate to in response to a command by the user. In some embodiments, the wearable ring device further includes a haptic actuator for identifying recognition of the command to the user and a second haptic actuator, wherein the haptic actuator and second haptic actuator are configured for conveying directional information to the user. In some embodiments, the wearable ring device further includes a dial control for receiving input from the user, a wireless power receiver circuit for recharging the power source from a wireless power source, and/or a sensor for sensing a writing motion of the user, wherein the wireless transceiver transmits information to the at least one external electronic device related to characters written by the user. In some embodiments, the wearable ring device further includes a biometric sensor for sensing biometric information of the user and/or a near-field-communication transmitter for transmitting data related to the user.

In some implementations, a method for controlling a remote electronic device using a finger-ring-mounted touchscreen includes receiving, on a touchscreen electrically connected to a computer processor and disposed at least partially at an outer peripheral surface of a ring disposed on a first finger of a user, input from a second finger of the user, selecting, using the computer processor, one of a plurality of touch events associated with the input, and wirelessly transmitting a command associated with the touch event to at least one external electronic device. In some embodiments, the method further includes notifying the user of transmission of the command by issuing haptic feedback to the first finger of the user; selecting the one of the plurality of touch events may include recognizing a gesture made by the user that is associated with the command. In some embodiments, the external electronic device is a second finger-ring-mounted and the transmitted command causes the second finger-ring-mounted to issue feedback corresponding to a message of the user to a second user; the user may associate the input with the feedback. In some embodiments, the method further includes receiving, using a microphone electrically connected to the computer processor, a voice input of the user, and transmitting the voice input to the at least one external electronic device. In some embodiments, the method further includes activating the microphone in response to a command from the user and/or establishing a wireless link with the at least one external electronic device in response to a gesture by the user; the gesture may include pointing at the external electronic device with the first finger. In some embodiments, the method further includes detecting handwriting of the user using a motion sensor electrically connected to a computer processor and transmitting the detected handwriting to the at least one external electronic device; the input may be a character drawn by the user on the finger-ring-mounted touchscreen. The at least one external electronic device may further receive commands from at least one other finger-ring-mounted touchscreen. In some embodiments, a state of the external electronic device is changed and/or information is transmitted to the external electronic device by bringing a near-field communication device electrically connected to the computer processor into proximity therewith.

In some implementations, a method for displaying information using a ring computing device worn on a first finger of a user includes receiving, using a wireless transceiver electrically connected to a computer processor housed in the ring computing device, information transmitted from at least one external electronic device, and displaying information on a touchscreen electrically connected to the computer processor and disposed at least partially at an outer peripheral surface of the ring computing device. In some embodiments, the method further includes activating a haptic actuator based on the received information; the received information may include a character drawn by a second user of a second ring computing device, and activating the haptic actuator may include a plurality of pulses encoding the received information. In some embodiments, the method further includes receiving input from a second finger of the user on the touchscreen, selecting, using the computer processor, one of a plurality of touch events associated with the input; and wirelessly transmitting a command associated with the touch event to at least one external electronic device. In some embodiments, a state of the external electronic device is changed and/or information is transmitted to the external electronic device by bringing a near-field communication device electrically connected to the computer processor into proximity therewith.

The above deficiencies and other problems associated with user interfaces for electronic devices with touch-sensitive surfaces are reduced or eliminated by the disclosed devices. In some embodiments, the device is a ring computing device. In some embodiments, the device includes a touchpad. In some embodiments, the device includes a touch-sensitive display (also known as a "touch screen" or "touch-screen display"). In some embodiments, the device includes, one or more processors, memory and one or more modules, programs or sets of instructions stored in the memory for performing multiple functions including generating a graphical user interface (GUI). In some embodiments, the user interacts with the GUI primarily through finger contacts and/or gestures on the touch-sensitive surface or gestures captured by sensors disposed in or on the device. In some embodiments, the functions optionally include cursor control, video playback control, volume control, text capture, text entry, motion capture, or audio or video selection. Executable instructions for performing these functions are, optionally, included in a non-transitory computer readable storage medium or other computer program product configured for execution by one or more processors.

Thus, a ring computing device with a display, touch-sensitive surface and/or one or more sensors to detect the intensity of a contact with the touch-sensitive surface are provided with faster, more efficient methods and interfaces for controlling external electronic devices, thereby increasing the effectiveness, efficiency, and user satisfaction with such devices. For example, the ring computing device is more portable than a mouse, doesn't require a computer, doesn't require eye contact with the touch screen, allows the user to not be tied to a computer, cellular phone, or tablet to certain control electronic devices (e.g., televisions), reduces the inefficiencies of mode switching by not requiring a user to move his or her hand off a keyboard to move a mouse or touchpad, and is smaller, more portable, and less obtrusive than existing devices. The ring computing device can be operated using a single hand; the ring does not need to be put aside when, for example, the user needs to hold another object. The ring computing device can be carried unobtrusively for periods of time by the user and used when the user requires (to, for example, control light of a room as the user enters the room or to control devices at work or in a car). The ring computing device can also receive information from external devices in the form of messages or images on a touchscreen, pulses or vibrations of haptic actuators, and sound. Such methods and interfaces may complement or replace conventional methods for controlling external electronic devices or to receive and reply to information from external electronic devices, including other ring computing devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A, 6B, and 6C illustrate a ring computing devices in accordance with some embodiments.

DESCRIPTION OF EMBODIMENTS

Figure 6C:
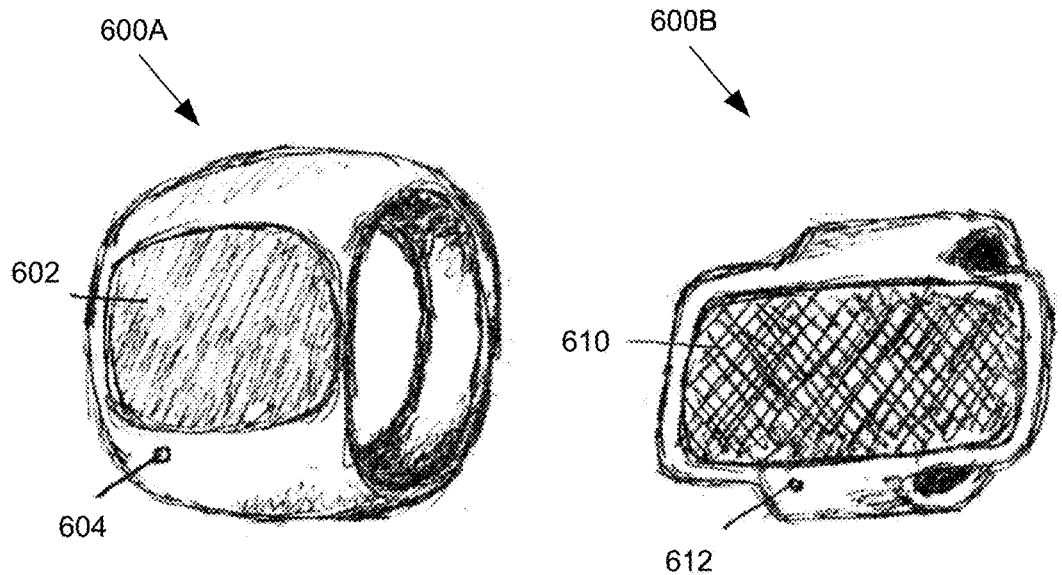
Figure 6C:
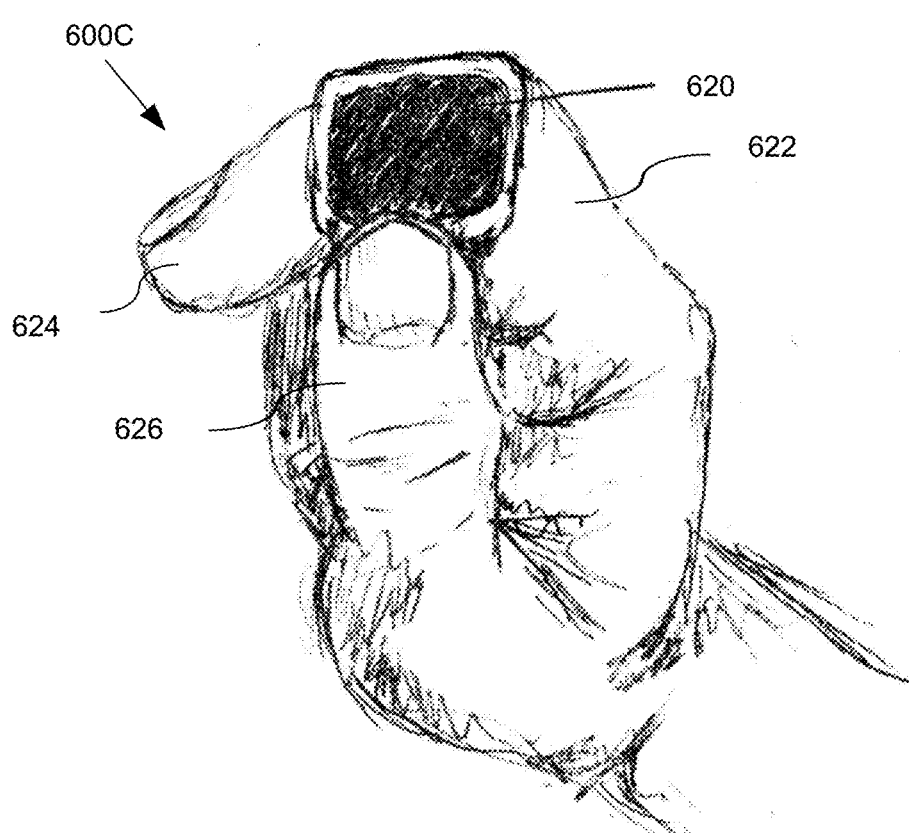

Various embodiments of the present invention include a ring computing device that is configured to be worn on a first finger of a user and that includes one or more components for capturing user input and/or for providing output to the user. As the term is used herein, "finger" means any finger of a user, including thumb, fore or index finger, middle finger, ring finger, and pinky finger of either hand. In some embodiments, the ring is preferably worn on the user's index finger of the user's predominant hand. The user may use the ring computing device to control one or more external electronic devices, such as a smart television, cellular telephone, laptop computer, tablet computer, automobile audio or telephone system, game console, smart watch, automation devices or any other such device. The ring computing device may employ a touch pad, touch screen, microphone, or motion sensors to capture user input via touches, audio commands, or hand gestures. In some embodiments, the user controls the device using a second finger (one of a thumb, fore or index finger, middle finger, ring finger, and pinky finger of either hand, different from the first finger). In those embodiments where the ring is worn on the user's index finder, the user will generally control the device using the thumb of that same hand as shown in FIG. 6C. In some embodiments, the device provides feedback to the user via speech or other audio or haptic feedback (e.g., vibrations), or via a display.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1:
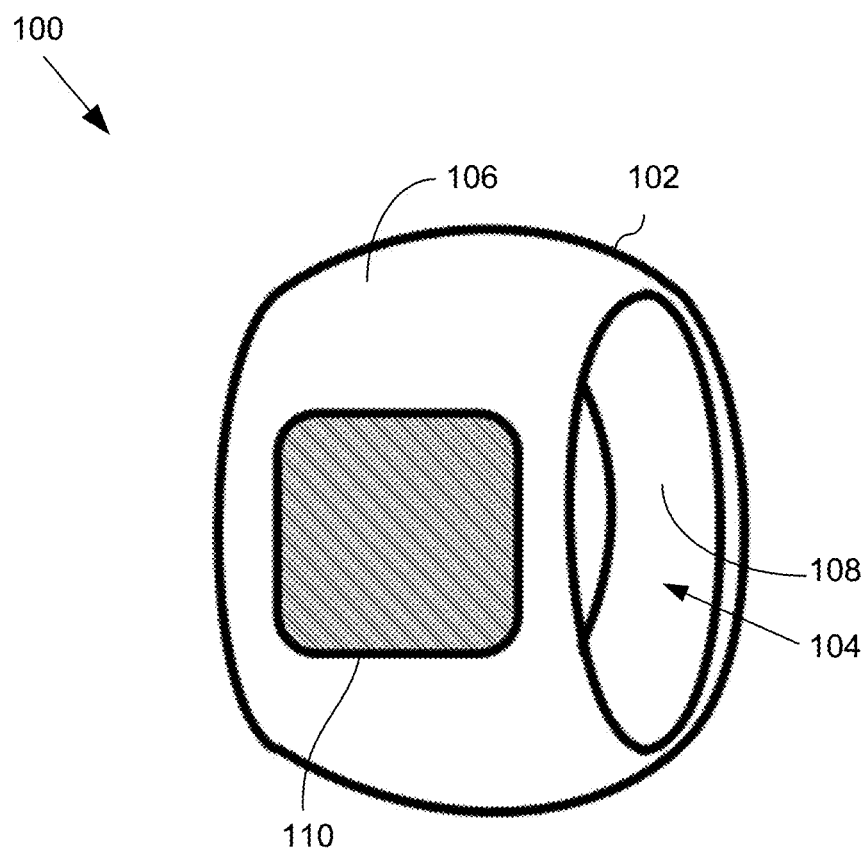
FIG. 1 illustrates a ring computing device with a touch-sensitive pad or display in accordance with some embodiments.

Attention is now directed toward embodiments of ring computing devices with touch-sensitive pads or displays. FIG. 1 illustrates a ring computing device 100 in accordance with some embodiments of the present invention. A structural member 102 houses one or more electronic components (such as a processor, memory, and sensors, as described in greater detail below with reference to FIG. 7) and defines an aperture 104 capable of receiving a user's finger. The member 102 includes an outer peripheral surface 106 and an inner peripheral surface 108. The inner peripheral surface 108 may be contoured or sized to conform to the finger of the user so that as the member 102 grips the finger with sufficient strength or force to prevent accidental slipping but without causing harm or discomfort to the user. The outer peripheral surface 106 may house or otherwise include one or more user input or output devices, such as, in the pictured embodiment, a touch screen or touch pad 110.

The touch screen or touch pad 110 may be any shape or size; in various embodiments, the touch screen or touch pad 110 is square, rectangular, circular, or oval, and may be approximately one centimeter to five centimeters per side or between opposing corners (i.e., a diagonal dimension). In some embodiments the touch screen or touch pad 110 has a diagonal dimension of less than three centimeters. In other embodiments, the touch screen or touch pad 110 has a diagonal dimension of less than two centimeters. The touch screen or touch pad 110 should have the smallest size while still providing ample control. In some embodiments, the touch screen or touch pad 110 is a capacitive touch screen, a resistive touch screen, or any other type of touch screen or touch pad known in the art. The resolution of the touch screen or pad may be approximately equal to that of the touch screen of a tablet computer or wrist computer (i.e., smart watch) or that of a laptop touchpad; in other embodiments, the resolution may be greater or smaller.

In some embodiments, the member 102 is made from a rigid or semirigid material, such as metal or plastic; the metal may be gold, silver, platinum, or any other metal. In other embodiments, the member 102 is made from a stretchable or expandable material, such as silicone. In some embodiments, a rigid member 102 is available in a plurality of different ring sizes from which a user may select, as appropriate, based on the size of the finger of the user. In other embodiments, the member 102 is made from a series of interconnected segments, where the user can add or subtract segments to achieve the desired ring size. In other embodiments, a stretchable member is available in only one size or a small number of sizes (e.g., small, medium, and large) and a user selects the single size or one of the small number of sizes of the member 102. In some embodiments, the touch screen or pad 110 (and some or all of its associated electronics, described in greater detail below with reference to FIG. 7) are separable from the member 102, thereby allowing a user to replace the member 102 with a replacement member 102 that may be of a different size, color, or material or allowing the user to place the touch screen or pad 110 (and some or all of its associated electronics, described in greater detail below with reference to FIG. 7) in a different device or apparatus, such as an appliance, television, or automobile dashboard. The user interface components of the ring (e.g., the touch screen or pad, buttons, camera, or sensors) may be configured such that the ring 100 is symmetrical and may thus be worn on fingers of either hand. In other embodiments, the ring 100 is configured to be non-symmetric and may thus be worn on the right or left hand. In some embodiments, the ring 100 is adjustable to fit different size fingers. Cylinders having a fixed-size outer circumference but having varied inner ring sizes may be inserted and attach to the ring aperture 104 to adjust for user finger size. In other embodiments, part of the ring 100 is mechanically or electronically moved and latched into position by the user or automatically (via, e.g., the use of sensors and actuators to sense the tightness of the ring on the user's finger), thereby increasing or decreasing the inner circumference of the ring to fit the user's finger size. The ring 100 may be worn on any portion of any finger; in some embodiments, the ring 100 is worn at the base of the index finger or toward the tip of the index finger.

Figure 2:
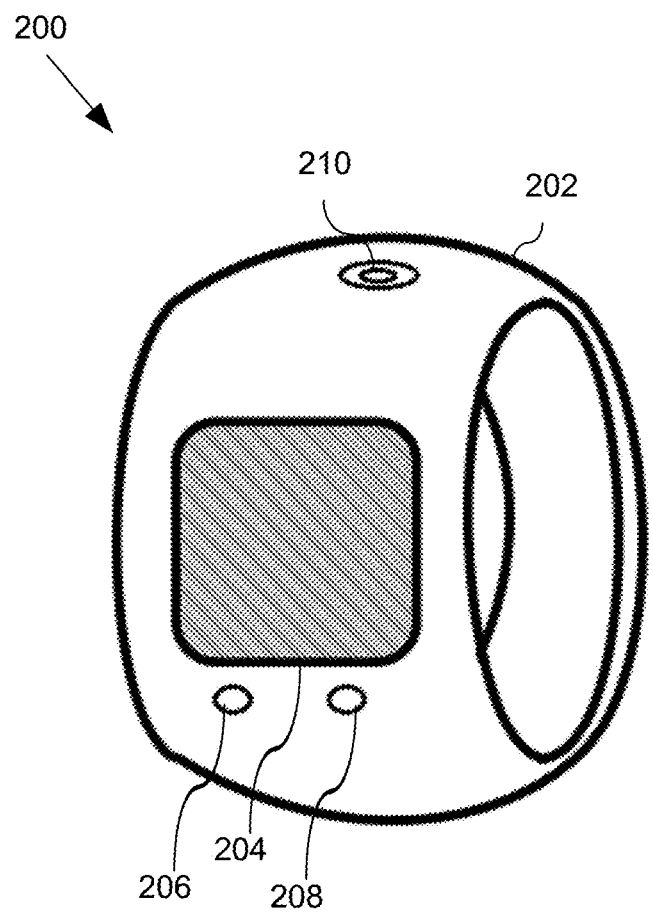
FIG. 2 illustrates a ring computing device with a touch-sensitive pad or display, camera, and buttons in accordance with some embodiments.

FIG. 2 illustrates a ring computing device 200 in accordance with some embodiments of the present invention. In this embodiment, the member 202 houses or includes a touch screen or touch pad 204 in addition to physical button(s) 206, 208. While two buttons 206, 208 are illustrated in this embodiment, any number of buttons are within the scope of the present invention. The buttons 206, 208 may be mechanical and include a depressible component that makes contact with a conductive element in response to a user press; the buttons 206, 208 may thereafter return to a default position in response to an expansion of a spring or other biasing element. The buttons 206, 208 may instead or in addition be electrically operated by sensing touch or proximity, e.g., through the capacitance of a user's finger. Any type of button is within the scope of the present invention, and one button 206 may be a first type while another button 208 may be a second type. In some embodiments, the ring computing device includes a still and/or video camera 210. In the illustrated embodiment, the camera 210 is disposed on or in the ring computing device 200 at approximately 90 degrees circumferential rotation away from the touchscreen or pad 204 such that the camera 210 faces outward when the user's hand is closed into a fist, and such that the view of the camera is not obscured by the user's palm; this placement may be ideal for capturing pictures from the point of view of the user. Any placement of the camera 210 is, however, within the scope of the present invention. Another camera 210 may be placed on the ring 200 approximately 90 degrees circumferential rotation away from the touch pad or screen 204 in the direction opposite the illustrated camera 210 (i.e., approximately 180 degrees circumferential rotation away from the illustrated camera 210); this placement may be ideal for capturing self-photographs of the user. The shutter of the camera 210 may be activated by a button 206, a gesture on the touchscreen or pad 204, by a voice input, by a hand gesture, or by any other input.

In some embodiments, the buttons 206, 208 activate fixed functions when pressed, such as "go to a home screen" or "activate voice recognition," while in other embodiments, the functions change based on a currently active application running on the device 200 (as described in greater detail below). In other embodiments, the functions of the buttons 206, 208 are programmable by the user using an on-device or remote configuration application.

Figure 3:
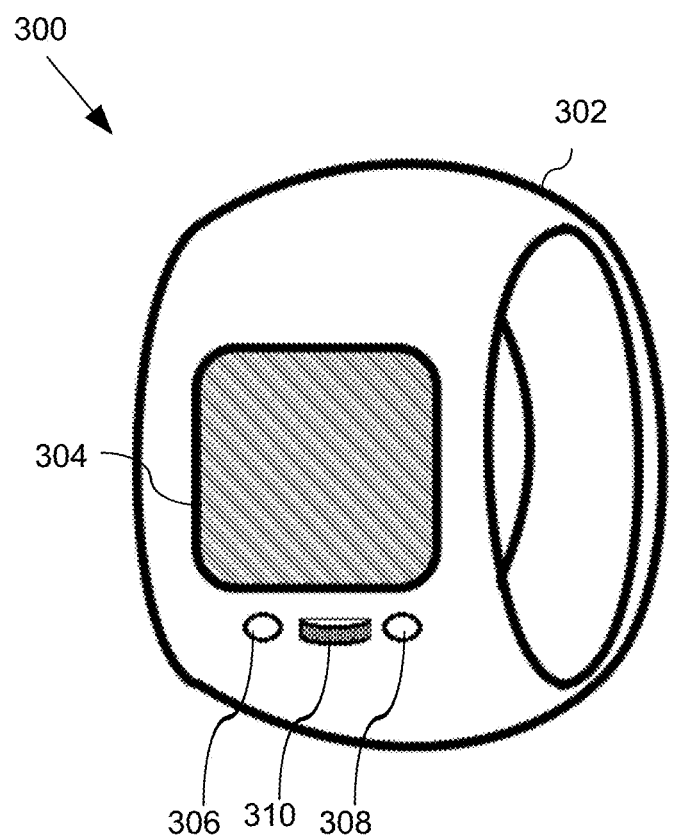
FIG. 3 illustrates a ring computing device with a touch-sensitive pad or display, buttons, and a dial control or crown in accordance with some embodiments.

FIG. 3 illustrates a ring computing device 300 in accordance with some embodiments of the present invention. Like the above-described embodiments, the device 300 includes a member 302 and a touch screen/pad 304. In some embodiments, the device 300 includes buttons 306, 308 as well as a dial control 310, also known as a "crown" or crown-style control. In various embodiments, a user may input commands to the device 300 by rotating the dial control 310 in one of two directions; the dial control 310 may also act as a button and activate another function when pressed. In some embodiments, rotating the dial control 310 scrolls through icons to invoke applications, through already open applications, or scrolls within an open application (e.g. to scroll a screen of the application or to select between objects, features, or other options within the application). In some embodiments, a small trackball is used instead of the dial control 310 to allow rotations in multiple directions. In this embodiment, rotation in one direction performs one function (e.g., a vertical scroll moves between application categories), and rotation in a perpendicular direction performs another function (e.g., a horizontal scroll moves between applications in a particular category).

Figure 4:
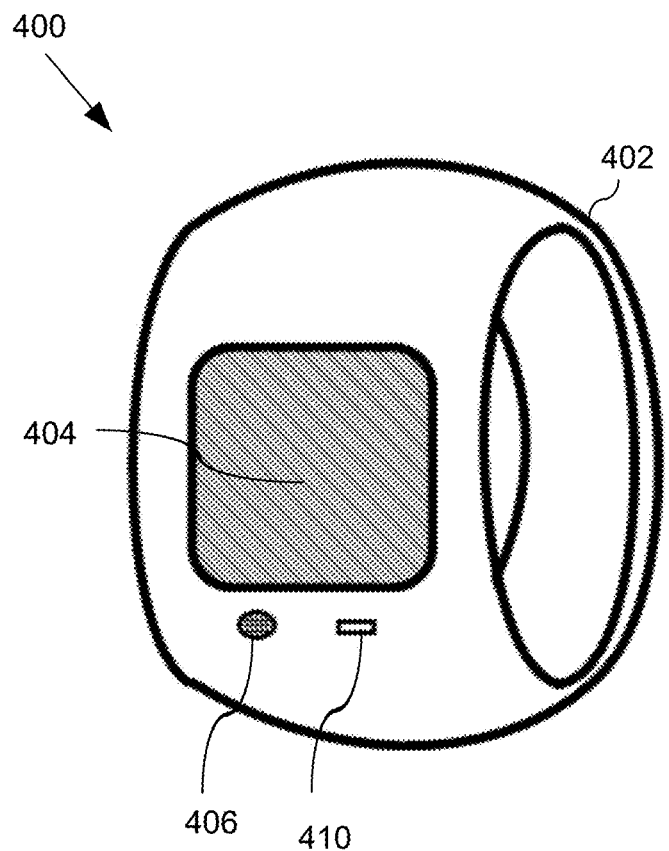
FIG. 4 illustrates a ring computing device with a touch-sensitive pad or display, a microphone, and a speaker in accordance with some embodiments.

FIG. 4 illustrates a ring computing device 400, in accordance with some embodiments of the present invention. The ring computing device 400 includes a member 402 and a touch screen/pad 404. In this embodiment, a speaker 406 housed in or included on the member 402 is configured to output audio to the user. In some embodiments, a microphone 410 is included to record audio input from the user and/or surrounding environment. In some embodiments, the ring computing device communicates via a wire or wirelessly with an external microphone and/or speakers.

Figure 5:
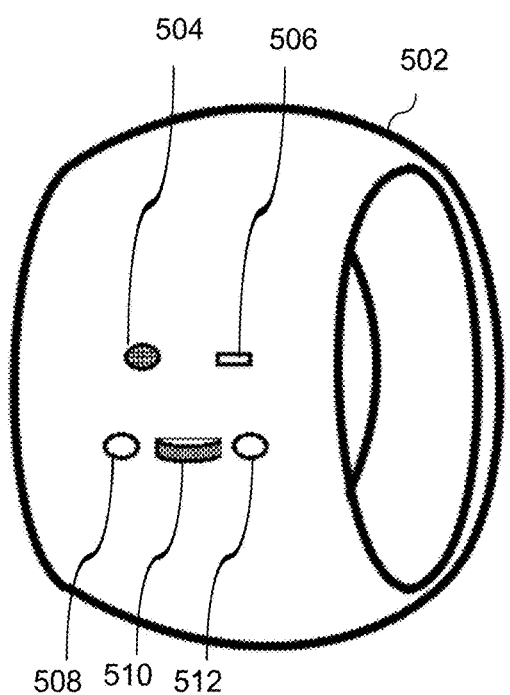
FIG. 5 illustrates a ring computing device with buttons, a dial control, a speaker, and a microphone in accordance with some embodiments.

FIG. 5 illustrates a ring computing device 500, in accordance with some embodiments of the present invention. The ring computing device 500 includes a speaker 504, a microphone 506, buttons 508, 512, and/or a dial control 510. In some embodiments, the device 500 does not include a touchscreen or touchpad.

FIGS. 6A, 6B, and 6C illustrate various embodiments of ring computing devices in accordance with the present invention. Device 600A includes a touch screen or pad 602 that is less than the width of the device, while device 600B includes a touch screen or pad 610 that is greater than a width of the device. Microphones 604, 612 are included on each device 600A, 600B.

FIG. 600C illustrates a device 620 being worn on a hand 622 of a user; the device is worn on a first finger 624 (here, an index finger) and is controlled with a second finger 626 (here, a thumb). The present invention is not limited to the device 620 being worn on an index finger, however; in other embodiments, the device 620 may be worn on any finger and controlled by any finger.

Figure 7:
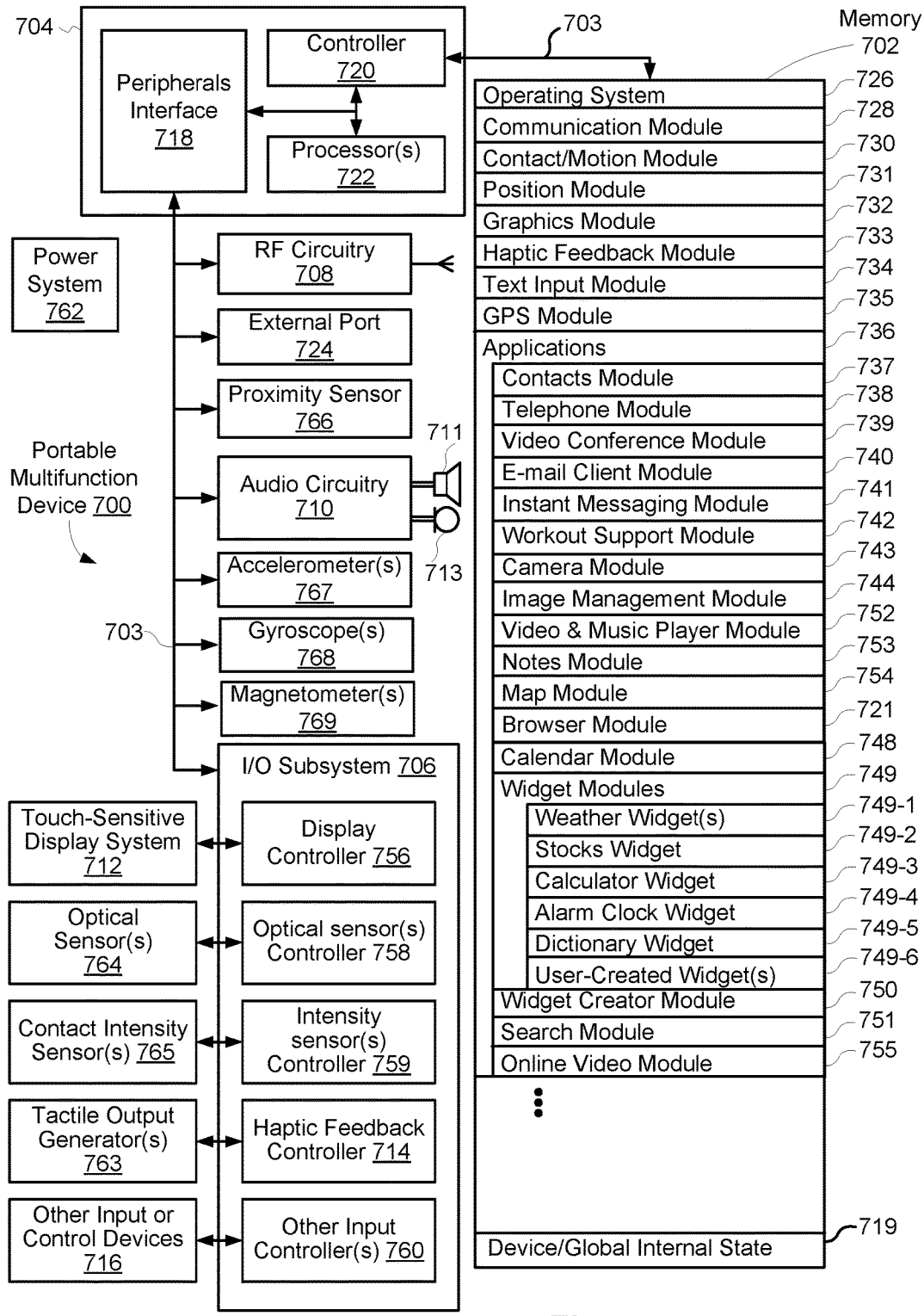
FIG. 7 is a block diagram illustrating an exemplary ring computing device system in accordance with some embodiments.

FIG. 7 is a block diagram illustrating a ring computing device 700 with touch-sensitive display or pad system 712 in accordance with some embodiments. Touch-sensitive display system 712 is sometimes called a "touch screen" for convenience, and is sometimes simply called a touch-sensitive display. Device 700 includes memory 702 (which optionally includes one or more computer readable storage mediums), memory controller 720, one or more processing units (CPUs) 722, peripherals interface 718, RF circuitry 708, audio circuitry 710, speaker 711, microphone 713, input/output (I/O) subsystem 706, other input or control devices 716, and external port 724. Device 700 optionally includes one or more optical sensors 764. Device 700 optionally includes one or more intensity sensors 765 for detecting intensity of contacts on device 700 (e.g., a touch-sensitive surface such as touch-sensitive display system 712 of device 700). Device 700 optionally includes one or more tactile output generators 763 for generating tactile outputs on device 700 (e.g., generating tactile outputs on a touch-sensitive surface such as touch-sensitive display system 712 of device 700 or touchpad 304 of device 300). These components optionally communicate over one or more communication buses or signal lines 703.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 700 is only one example of a ring computing device, and that device 700 optionally has more or fewer components than shown, optionally combines two or more components, or optionally has a different configuration or arrangement of the components. The various components shown in FIG. 7 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of device 700, such as CPU(s) 722 and the peripherals interface 718, is, optionally, controlled by memory controller 720.

Peripherals interface 718 can be used to couple input and output peripherals of the device to CPU(s) 722 and memory 702. The one or more processors 722 run or execute various software programs and/or sets of instructions stored in memory 702 to perform various functions for device 700 and to process data.

In some embodiments, peripherals interface 718, CPU(s) 722, and memory controller 720 are, optionally, implemented on a single chip, such as chip 704. In some other embodiments, they are, optionally, implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 708 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.17, IEEE 802.17c, IEEE 802.17x, IEEE 802.18, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to human-audible sound waves. Audio circuitry 710 also receives electrical signals converted by microphone 713 from sound waves. Audio circuitry 710 converts the electrical signal to audio data and transmits the audio data to peripherals interface 718 for processing. Audio data is, optionally, retrieved from and/or transmitted to memory 702 and/or RF circuitry 708 by peripherals interface 718. In some embodiments, audio circuitry 710 also includes a headset jack (e.g., 212, FIG. 2). The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch-sensitive display system 712 and other input or control devices 716, with peripherals interface 718. I/O subsystem 706 optionally includes display controller 756, optical sensor controller 758, intensity sensor controller 759, haptic feedback controller 714, and one or more input controllers 760 for other input or control devices. The one or more input controllers 760 receive/send electrical signals from/to other input or control devices 716. The other input or control devices 716 optionally include physical buttons (e.g., push buttons, rocker buttons, etc.), dials, slider switches, joysticks, click wheels, and so forth or biometric sensors such as heart-rate or pulse monitors, skin-electrical-resistance monitors, pressure sensors, perspiration analyzers, fingerprint readers, and so forth . In some alternate embodiments, input controller(s) 760 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 711 and/or microphone 713. The one or more buttons optionally include a push button (e.g., 206, FIG. 2).

Touch-sensitive display system 712 provides an input interface and an output interface between the device and a user. Display controller 756 receives and/or sends electrical signals from/to touch-sensitive display system 712. Touch-sensitive display system 712 displays visual output to the user. The visual output optionally includes graphics, text, icons, video, and any combination thereof (collectively termed "graphics"). In some embodiments, some or all of the visual output corresponds to user-interface objects.

Touch-sensitive display system 712 has a touch-sensitive surface, sensor or set of sensors that accepts input from the user based on haptic/tactile contact. Touch-sensitive display system 712 and display controller 756 (along with any associated modules and/or sets of instructions in memory 702) detect contact (and any movement or breaking of the contact) on touch-sensitive display system 712 and converts the detected contact into interaction with user-interface objects (e.g., one or more soft keys, icons, web pages or images) that are displayed on touch-sensitive display system 712. In an exemplary embodiment, a point of contact between touch-sensitive display system 712 and the user corresponds to a finger of the user or a stylus.

Touch-sensitive display system 712 optionally uses LCD (liquid crystal display) technology, LPD (light emitting polymer display) technology, or LED (light emitting diode) technology, although other display technologies are used in other embodiments. Touch-sensitive display system 712 and display controller 756 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 712. In an exemplary embodiment, projected mutual capacitance sensing technology is used, such as that found in the iPhone®, iPod Touch®, and iPad® from Apple Inc. of Cupertino, Calif.

Touch-sensitive display system 712 optionally has a video resolution in excess of 700 dpi. In some embodiments, the touch screen video resolution is in excess of 400 dpi (e.g., 500 dpi, 800 dpi, or greater). The user optionally makes contact with touch-sensitive display system 712 using any suitable object or digit, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to or instead of the touch screen, device 700 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 712 or an extension of the touch-sensitive surface formed by the touch screen.

Device 700 also includes power system 762 for powering the various components. Power system 762 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The recharging system may be configured to receive wired power (from, e.g., a micro-USB charger) or wireless power transmitted via electromagnetic waves.

Device 700 optionally also includes one or more optical sensors 764. FIG. 7 shows an optical sensor coupled with optical sensor controller 758 in I/O subsystem 706. Optical sensor(s) 764 optionally include charge-coupled device (CCD) or complementary metal-oxide semiconductor (CMOS) phototransistors. Optical sensor(s) 764 receive light from the environment, projected through one or more lens, and converts the light to data representing an image. In conjunction with imaging module 743 (also called a camera module), optical sensor(s) 764 optionally capture still images and/or video. In some embodiments, an optical sensor is located on the back of device 700, opposite touch-sensitive display system 712 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 700 optionally also includes one or more contact intensity sensors 765. FIG. 7 shows a contact intensity sensor coupled with intensity sensor controller 759 in I/O subsystem 706. Contact intensity sensor(s) 765 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 765 receive contact intensity information (e.g., pressure information or a proxy for pressure information) from the environment. In some embodiments, at least one contact intensity sensor is collocated with, or proximate to, a touch-sensitive surface (e.g., touch-sensitive display system 712). In some embodiments, at least one contact intensity sensor is located on the back of device 700, opposite touch-screen display system 712 which is located on the front of device 700.

Device 700 optionally also includes one or more proximity sensors 766. FIG. 7 shows proximity sensor 766 coupled with peripherals interface 718. Alternately, proximity sensor 766 is coupled with input controller 760 in I/O subsystem 706. In some embodiments, the proximity sensor turns off and disables touch-sensitive display system 712 when the multifunction device is placed near the user's ear (e.g., when the user is making a phone call).

Device 700 optionally also includes one or more tactile output generators 763. FIG. 7 shows a tactile output generator coupled with haptic feedback controller 714 in I/O subsystem 706. Tactile output generator(s) 763 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 763 receive tactile feedback generation instructions from haptic feedback module 733 and generates tactile outputs on device 700 that are capable of being sensed by a user of device 700. In some embodiments, at least one tactile output generator is collocated with, or proximate to, a touch-sensitive surface (e.g., touch-sensitive display system 712) and, optionally, generates a tactile output by moving the touch-sensitive surface vertically (e.g., in/out of a surface of device 700) or laterally (e.g., back and forth in the same plane as a surface of device 700). In some embodiments, at least one tactile output generator sensor is located on the back of device 700, opposite touch-sensitive display system 712, which is located on the front of device 700.

Device 700 optionally also includes one or more accelerometers 767, gyroscopes 768, and/or magnetometers 769 (e.g., as part of an inertial measurement unit (IMU)) for obtaining information concerning the position (e.g., attitude) of the device. FIG. 7 shows sensors 767, 768, and 769 coupled with peripherals interface 718. Alternately, sensors 767, 768, and 769 are, optionally, coupled with an input controller 760 in I/O subsystem 706. In some embodiments, information is displayed on the touch-screen display in a portrait view or a landscape view based on an analysis of data received from the one or more accelerometers. Device 700 optionally includes a GPS (or GLONASS or other global navigation system) receiver (not shown) for obtaining information concerning the location of device 700.

In some embodiments, the software components stored in memory 702 include operating system 726, communication module (or set of instructions) 728, contact/motion module (or set of instructions) 730, position module (or set of instructions) 731, graphics module (or set of instructions) 732, haptic feedback module (or set of instructions) 733, text input module (or set of instructions) 734, Global Positioning System (GPS) module (or set of instructions) 735, and applications (or sets of instructions) 736. Furthermore, in some embodiments, memory 702 stores device/global internal state 719, as shown in FIGS. 7 and 3. Device/global internal state 719 includes one or more of: active application state, indicating which applications, if any, are currently active; display state, indicating what applications, views or other information occupy various regions of touch-sensitive display system 712; sensor state, including information obtained from the device's various sensors and other input or control devices 716; and location and/or positional information concerning the device's location and/or attitude.

Operating system 726 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 708 and/or external port 724. External port 724 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 730 optionally detects contact with touch-sensitive display system 712 (in conjunction with display controller 756) and other touch-sensitive devices (e.g., a touchpad or physical click wheel). Contact/motion module 730 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 730 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 730 and display controller 756 detect contact on a touchpad.

Contact/motion module 730 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 731, in conjunction with accelerometers 767, gyroscopes 768, and/or magnetometers 769, optionally detects positional information concerning the device, such as the device's attitude (roll, pitch, and/or yaw) in a particular frame of reference. Position module 731 includes software components for performing various operations related to detecting the position of the device and detecting changes to the position of the device. In some embodiments, position module 731 uses information received from a stylus being used with the device to detect positional information concerning the stylus, such as detecting the positional state of the stylus relative to the device and detecting changes to the positional state of the stylus.

Graphics module 732 includes various known software components for rendering and displaying graphics on touch-sensitive display system 712 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 732 stores data representing graphics to be used. Each graphic is, optionally, assigned a corresponding code. Graphics module 732 receives, from applications etc., one or more codes specifying graphics to be displayed along with, if necessary, coordinate data and other graphic property data, and then generates screen image data to output to display controller 756.

Haptic feedback module 733 includes various software components for generating instructions used by tactile output generator(s) 763 to produce tactile outputs at one or more locations on device 700 in response to user interactions with device 700 or in response to information received by device 700.

Text input module 734, which is, optionally, a component of graphics module 732, provides soft keyboards for entering text in various applications (e.g., contacts 737, e-mail 740, IM 741, browser 721, and any other application that needs text input).

GPS module 735 determines the location of the device and provides this information for use in various applications (e.g., to telephone 738 for use in location-based dialing, to camera 743 as picture/video metadata, and to applications that provide location-based services such as weather widgets, local yellow page widgets, and map/navigation widgets).

Applications 736 optionally include the following modules (or sets of instructions), or a subset or superset thereof: contacts module 737 (sometimes called an address book or contact list); telephone module 738; video conferencing module 739; e mail client module 740; instant messaging (IM) module 741; workout support module 742; camera module 743 for still and/or video images; image management module 744; browser module 721; calendar module 748; widget modules 749, which optionally include one or more of: weather widget 749-1, stocks widget 749-2, calculator widget 749-3, alarm clock widget 749-4, dictionary widget 749-5, and other widgets obtained by the user, as well as user-created widgets 749-6; widget creator module 750 for making user-created widgets 749-6; search module 751; video and music player module 752, which is, optionally, made up of a video player module and a music player module; notes module 753; map module 754; and/or online video module 755.

Examples of other applications 736 that are, optionally, stored in memory 702 include other word processing applications, other image editing applications, drawing applications, presentation applications, JAVA-enabled applications, encryption, digital rights management, voice recognition, and voice replication.

In conjunction with touch-sensitive display system 712, display controller 756, contact module 730, graphics module 732, and text input module 734, contacts module 737 includes executable instructions to manage an address book or contact list (e.g., stored in application internal state 792 of contacts module 737 in memory 702, including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 738, video conference 739, e-mail 740, or IM 741; and so forth.

In conjunction with RF circuitry 708, audio circuitry 710, speaker 711, microphone 713, touch-sensitive display system 712, display controller 756, contact module 730, graphics module 732, and text input module 734, telephone module 738 includes executable instructions to enter a sequence of characters corresponding to a telephone number, access one or more telephone numbers in address book 737, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 708, audio circuitry 710, speaker 711, microphone 713, touch-sensitive display system 712, display controller 756, optical sensor(s) 764, optical sensor controller 758, contact module 730, graphics module 732, text input module 734, contact list 737, and telephone module 738, videoconferencing module 739 includes executable instructions to initiate, conduct, and terminate a video conference between a user and one or more other participants in accordance with user instructions.

In conjunction with RF circuitry 708, touch-sensitive display system 712, display controller 756, contact module 730, graphics module 732, and text input module 734, e-mail client module 740 includes executable instructions to create, send, receive, and manage e-mail in response to user instructions. In conjunction with image management module 744, e-mail client module 740 makes it very easy to create and send e-mails with still or video images taken with camera module 743.

In conjunction with RF circuitry 708, touch-sensitive display system 712, display controller 756, contact module 730, graphics module 732, and text input module 734, the instant messaging module 741 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 708, touch-sensitive display system 712, display controller 756, contact module 730, graphics module 732, text input module 734, GPS module 735, map module 754, and music player module 752, workout support module 742 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 712, display controller 756, optical sensor(s) 764, optical sensor controller 758, contact module 730, graphics module 732, and image management module 744, camera module 743 includes executable instructions to capture still images or video (including a video stream) and store them into memory 702, modify characteristics of a still image or video, and/or delete a still image or video from memory 702.

In conjunction with touch-sensitive display system 712, display controller 756, contact module 730, graphics module 732, text input module 734, and camera module 743, image management module 744 includes executable instructions to arrange, modify (e.g., edit), or otherwise manipulate, label, delete, present (e.g., in a digital slide show or album), and store still and/or video images.

In conjunction with RF circuitry 708, touch-sensitive display system 712, display system controller 756, contact module 730, graphics module 732, and text input module 734, browser module 721 includes executable instructions to browse the Internet in accordance with user instructions, including searching, linking to, receiving, and displaying web pages or portions thereof, as well as attachments and other files linked to web pages.

In conjunction with RF circuitry 708, touch-sensitive display system 712, display system controller 756, contact module 730, graphics module 732, text input module 734, e-mail client module 740, and browser module 721, calendar module 748 includes executable instructions to create, display, modify, and store calendars and data associated with calendars (e.g., calendar entries, to do lists, etc.) in accordance with user instructions.

In conjunction with RF circuitry 708, touch-sensitive display system 712, display system controller 756, contact module 730, graphics module 732, text input module 734, and browser module 721, widget modules 749 are mini-applications that are, optionally, downloaded and used by a user (e.g., weather widget 749-1, stocks widget 749-2, calculator widget 749-3, alarm clock widget 749-4, and dictionary widget 749-5) or created by the user (e.g., user-created widget 749-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 708, touch-sensitive display system 712, display system controller 756, contact module 730, graphics module 732, text input module 734, and browser module 721, the widget creator module 750 includes executable instructions to create widgets (e.g., turning a user-specified portion of a web page into a widget).

In conjunction with touch-sensitive display system 712, display system controller 756, contact module 730, graphics module 732, and text input module 734, search module 751 includes executable instructions to search for text, music, sound, image, video, and/or other files in memory 702 that match one or more search criteria (e.g., one or more user-specified search terms) in accordance with user instructions.

In conjunction with touch-sensitive display system 712, display system controller 756, contact module 730, graphics module 732, audio circuitry 710, speaker 711, RF circuitry 708, and browser module 721, video and music player module 752 includes executable instructions that allow the user to download and play back recorded music and other sound files stored in one or more file formats, such as MP3 or AAC files, and executable instructions to display, present or otherwise play back videos (e.g., on touch-sensitive display system 712, or on an external display connected wirelessly or via external port 724). In some embodiments, device 700 optionally includes the functionality of an MP3 player, such as an iPod (trademark of Apple Inc.).

In conjunction with touch-sensitive display system 712, display controller 756, contact module 730, graphics module 732, and text input module 734, notes module 753 includes executable instructions to create and manage notes, to do lists, and the like in accordance with user instructions.

In conjunction with RF circuitry 708, touch-sensitive display system 712, display system controller 756, contact module 730, graphics module 732, text input module 734, GPS module 735, and browser module 721, map module 754 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 712, display system controller 756, contact module 730, graphics module 732, audio circuitry 710, speaker 711, RF circuitry 708, text input module 734, e-mail client module 740, and browser module 721, online video module 755 includes executable instructions that allow the user to access, browse, receive (e.g., by streaming and/or download), play back (e.g., on the touch screen 712, or on an external display connected wirelessly or via external port 724), send an e-mail with a link to a particular online video, and otherwise manage online videos in one or more file formats, such as H.264. In some embodiments, instant messaging module 741, rather than e-mail client module 740, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 702 optionally stores a subset of the modules and data structures identified above. Furthermore, memory 702 optionally stores additional modules and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 is, optionally, reduced.

The predefined set of functions that are performed exclusively through a touch screen and/or a touchpad optionally include navigation between user interfaces. In some embodiments, the touchpad, when touched by the user, navigates device 700 to a main, home, or root menu from any user interface that is displayed on device 700. In such embodiments, a "menu button" is implemented using a touchpad. In some other embodiments, the menu button is a physical push button or other physical input control device instead of a touchpad.

Figure 8:
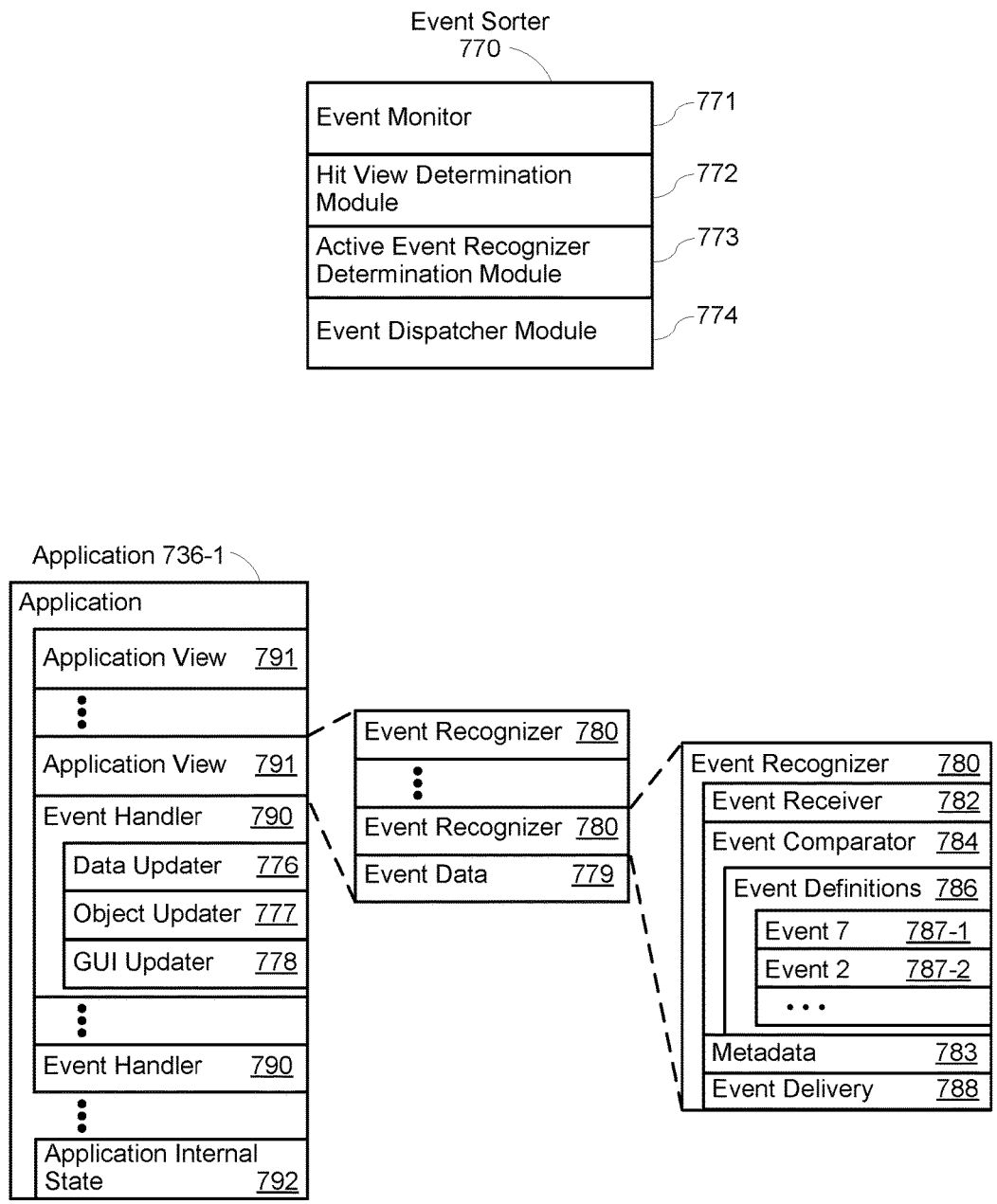
FIG. 8 is a block diagram illustrating exemplary components for event handling in accordance with some embodiments.

FIG. 8 is a block diagram illustrating exemplary components for event handling in accordance with some embodiments. In some embodiments, memory 702 (in FIG. 7)

includes event sorter 770 (e.g., in operating system 726) and a respective application 736-1 (e.g., any of the aforementioned applications 736, 737-755).

Event sorter 770 receives event information and determines the application 736-1 and application view 791 of application 736-1 to which to deliver the event information. Event sorter 770 includes event monitor 771 and event dispatcher module 774. In some embodiments, application 736-1 includes application internal state 792, which indicates the current application view(s) displayed on touch-sensitive display system 712 when the application is active or executing. In some embodiments, device/global internal state 719 is used by event sorter 770 to determine which application(s) is (are) currently active, and application internal state 792 is used by event sorter 770 to determine application views 791 to which to deliver event information.

In some embodiments, application internal state 792 includes additional information, such as one or more of: resume information to be used when application 736-1 resumes execution, user interface state information that indicates information being displayed or that is ready for display by application 736-1, a state queue for enabling the user to go back to a prior state or view of application 736-1, and a redo/undo queue of previous actions taken by the user.

Event monitor 771 receives event information from peripherals interface 718. Event information includes information about a sub-event (e.g., a user touch on touch-sensitive display system 712, as part of a multi-touch gesture). Peripherals interface 718 transmits information it receives from I/O subsystem 706 or a sensor, such as proximity sensor 766, accelerometer(s) 767, gyroscope(s) 768, magnetometer(s) 769, and/or microphone 713 (through audio circuitry 710). Information that peripherals interface 718 receives from I/O subsystem 706 includes information from touch-sensitive display system 712 or a touch-sensitive surface.

In some embodiments, event monitor 771 sends requests to the peripherals interface 718 at predetermined intervals. In response, peripherals interface 718 transmits event information. In other embodiments, peripheral interface 718 transmits event information only when there is a significant event (e.g., receiving an input above a predetermined noise threshold and/or for more than a predetermined duration).

In some embodiments, event sorter 770 also includes a hit view determination module 772 and/or an active event recognizer determination module 773.

Hit view determination module 772 provides software procedures for determining where a sub-event has taken place within one or more views, when touch-sensitive display system 712 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 772 receives information related to sub-events of a touch-based gesture. When an application has multiple views organized in a hierarchy, hit view determination module 772 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 773 determines which view or views within a view hierarchy should receive a particular sequence of sub-events. In some embodiments, active event recognizer determination module 773 determines that only the hit view should receive a particular sequence of sub-events. In other embodiments, active event recognizer determination module 773 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 774 dispatches the event information to an event recognizer (e.g., event recognizer 780). In embodiments including active event recognizer determination module 773, event dispatcher module 774 delivers the event information to an event recognizer determined by active event recognizer determination module 773. In some embodiments, event dispatcher module 774 stores in an event queue the event information, which is retrieved by a respective event receiver module 782.

In some embodiments, operating system 726 includes event sorter 770. Alternatively, application 736-1 includes event sorter 770. In yet other embodiments, event sorter 770 is a stand-alone module, or a part of another module stored in memory 702, such as contact/motion module 730.

In some embodiments, application 736-1 includes a plurality of event handlers 790 and one or more application views 791, each of which includes instructions for handling touch events that occur within a respective view of the application's user interface. Each application view 791 of the application 736-1 includes one or more event recognizers 780. Typically, a respective application view 791 includes a plurality of event recognizers 780. In other embodiments, one or more of event recognizers 780 are part of a separate module, such as a user interface kit (not shown) or a higher level object from which application 736-1 inherits methods and other properties. In some embodiments, a respective event handler 790 includes one or more of: data updater 776, object updater 777, GUI updater 778, and/or event data 779 received from event sorter 770. Event handler 790 optionally utilizes or calls data updater 776, object updater 777 or GUI updater 778 to update the application internal state 792. Alternatively, one or more of the application views 791 includes one or more respective event handlers 790. Also, in some embodiments, one or more of data updater 776, object updater 777, and GUI updater 778 are included in a respective application view 791.

A respective event recognizer 780 receives event information (e.g., event data 779) from event sorter 770, and identifies an event from the event information. Event recognizer 780 includes event receiver 782 and event comparator 784. In some embodiments, event recognizer 780 also includes at least a subset of: metadata 783, and event delivery instructions 788 (which optionally include sub-event delivery instructions).

Event receiver 782 receives event information from event sorter 770. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 784 compares the event information to predefined event or sub-event definitions and, based on the comparison, determines an event or sub-event, or determines or updates the state of an event or sub-event. In some embodiments, event comparator 784 includes event definitions 786. Event definitions 786 contain definitions of events (e.g., predefined sequences of sub-events), for example, event 1 (787-1), event 2 (787-2), and others. In some embodiments, sub-events in an event 787 include, for example, touch begin, touch end, touch movement, touch cancellation, and multiple touching. In one example, the definition for event 1 (787-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (787-2) is a dragging on a displayed object. The dragging, for example, comprises a touch (or contact) on the displayed object for a predetermined phase, a movement of the touch across touch-sensitive display system 712, and lift-off of the touch (touch end). In some embodiments, the event also includes information for one or more associated event handlers 790.

In some embodiments, event definition 786 includes a definition of an event for a respective user-interface object. In some embodiments, event comparator 784 performs a hit test to determine which user-interface object is associated with a sub-event. For example, in an application view in which three user-interface objects are displayed on touch-sensitive display system 712, when a touch is detected on touch-sensitive display system 712, event comparator 784 performs a hit test to determine which of the three user-interface objects is associated with the touch (sub-event). If each displayed object is associated with a respective event handler 790, the event comparator uses the result of the hit test to determine which event handler 790 should be activated. For example, event comparator 784 selects an event handler associated with the sub-event and the object triggering the hit test.

In some embodiments, the definition for a respective event 787 also includes delayed actions that delay delivery of the event information until after it has been determined whether the sequence of sub-events does or does not correspond to the event recognizer's event type.

When a respective event recognizer 780 determines that the series of sub-events do not match any of the events in event definitions 786, the respective event recognizer 780 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 780 includes metadata 783 with configurable properties, flags, and/or lists that indicate how the event delivery system should perform sub-event delivery to actively involved event recognizers. In some embodiments, metadata 783 includes configurable properties, flags, and/or lists that indicate how event recognizers interact, or are enabled to interact, with one another. In some embodiments, metadata 783 includes configurable properties, flags, and/or lists that indicate whether sub-events are delivered to varying levels in the view or programmatic hierarchy.

In some embodiments, a respective event recognizer 780 activates event handler 790 associated with an event when one or more particular sub-events of an event are recognized. In some embodiments, a respective event recognizer 780 delivers event information associated with the event to event handler 790. Activating an event handler 790 is distinct from sending (and deferred sending) sub-events to a respective hit view. In some embodiments, event recognizer 780 throws a flag associated with the recognized event, and event handler 790 associated with the flag catches the flag and performs a predefined process.

In some embodiments, event delivery instructions 788 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 776 creates and updates data used in application 736-1. For example, data updater 776 updates the telephone number used in contacts module 737, or stores a video file used in video player module 752. In some embodiments, object updater 777 creates and updates objects used in application 736-1. For example, object updater 777 creates a new user-interface object or updates the position of a user-interface object. GUI updater 778 updates the GUI. For example, GUI updater 778 prepares display information and sends it to graphics module 732 for display on a touch-sensitive display.

In some embodiments, event handler(s) 790 includes or has access to data updater 776, object updater 777, and GUI updater 778. In some embodiments, data updater 776, object updater 777, and GUI updater 778 are included in a single module of a respective application 736-1 or application view 791. In other embodiments, they are included in two or more software modules.

It shall be understood that the foregoing discussion regarding event handling of user touches on touch-sensitive displays also applies to other forms of user inputs to operate multifunction devices 700 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Device 700 optionally also includes one or more physical buttons, such as a "home" or menu button. As described previously, the menu button is, optionally, used to navigate to any application 736 in a set of applications that are, optionally executed on device 700. Alternatively, in some embodiments, the menu button is implemented as a soft key in a GUI displayed on the touch-screen display.

In some embodiments, device 700 includes the touch-screen display, menu button, push button 206 for powering the device on/off and locking the device, volume adjustment button(s) 208, a Subscriber Identity Module (SIM) card slot, a head set jack, and docking/charging external port 724. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 700 also accepts verbal input for activation or deactivation of some functions through microphone 713. Device 700 also, optionally, includes one or more contact intensity sensors 765 for detecting intensity of contacts on touch-sensitive display system 712 and/or one or more tactile output generators 763 for generating tactile outputs for a user of device 700.

Figure 9:
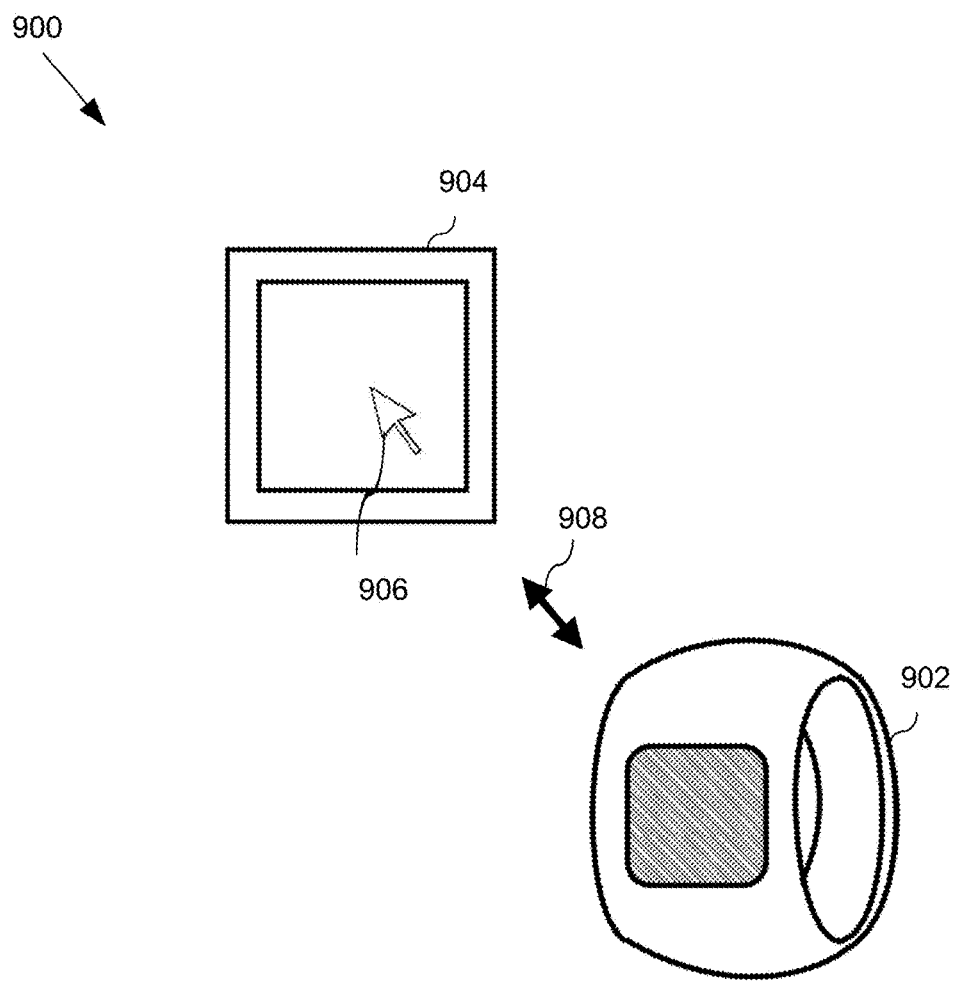
FIG. 9 illustrates a ring computing device communicating with an external electronic device in accordance with some embodiments.

FIG. 9 illustrates a system 900 in accordance with embodiments of the present invention. A ring computing device 902, in accordance with embodiments described therein, communicates with an external electronic device 904. In this embodiment, the external electronic device is a display screen displaying a pointer 906; any type of external electronic device is within the scope of the present invention, however, and may be, but is not limited to a smart television, laptop computer, desktop computer, tablet computer, smart watch, automobile audio system, home, work, or environment automation device, or any other such device or system. Similarly, the screen element need not be a pointer 906, but may be any displayed user interface element, such as a cursor, slider, or button, or may be an undisplayed user interface element, such as a volume control. The ring computing device 902 communicates with the external electronic device 904 via a wireless link 908, which may be a WI-FI, BLUETOOTH, NFC, or any other type of wireless link. The link may 908 may be uni-directional (i.e., the ring computing device may only send or receive data or commands to the external electronic device) or bi-directional (i.e., the ring computing device may both send and receive data or commands to the external electronic device). The nature of the link 908 may vary over time, and it may be uni-directional at one point in time and bi-directional at a second point in time. The ring computing device 902 may control multiple external electronic devices 904 either simultaneously or individually.

Figure 10:
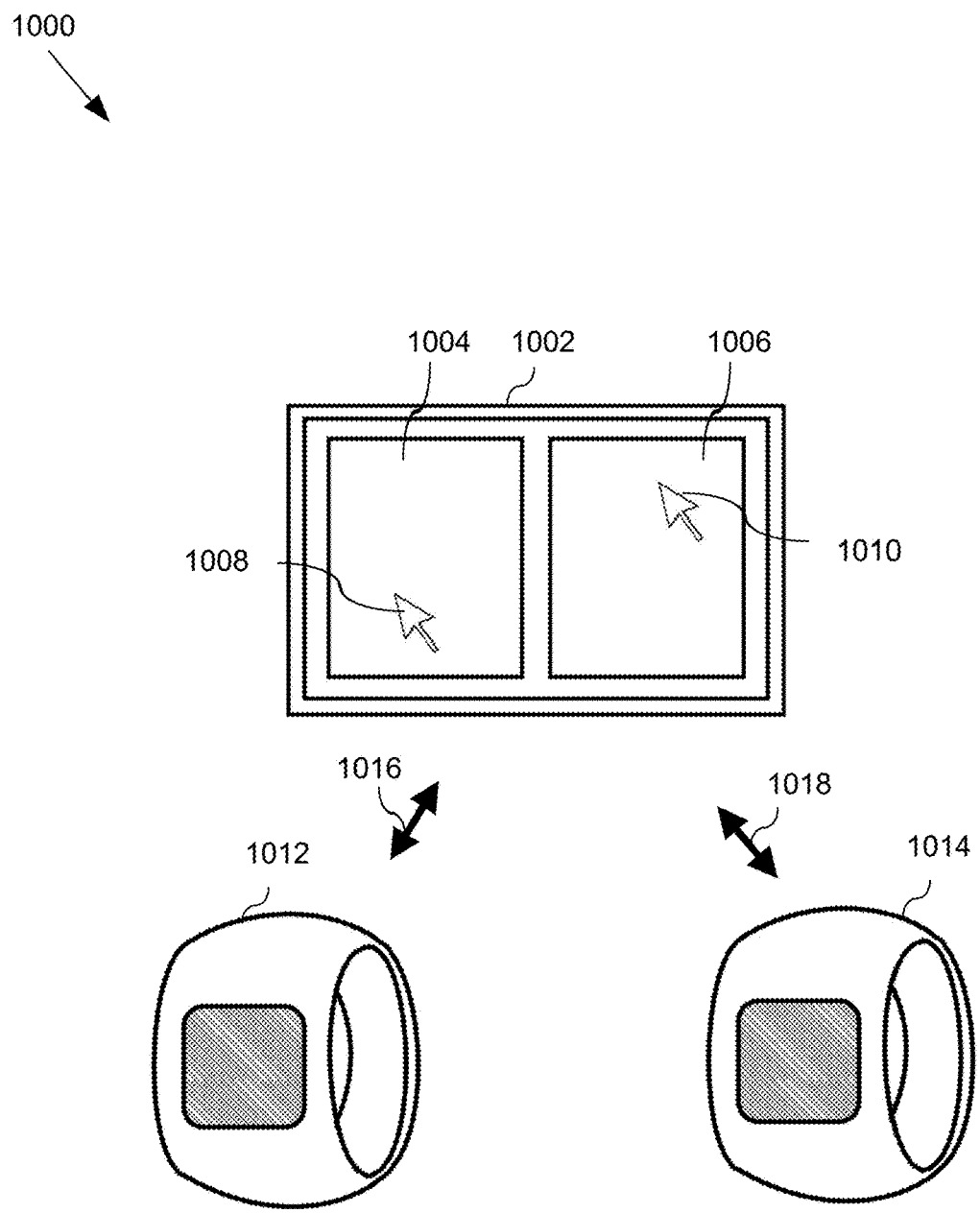
FIG. 10 illustrates two ring computing devices communicating with an external electronic device in accordance with some embodiments.

FIG. 10 illustrates a system 1000 in accordance with embodiments of the present invention. The system 1000 includes an external electronic device 1002 that has two application windows 1004, 1006, each featuring a pointer 1008, 1010. The application windows 1004, 1006 may correspond to two different applications running on the external electronic device 1002 or two windows of the same application. One application may be, for example, a video player, and the second may be a web browser. Two ring computing devices 1012, 1014 may be used by the same or different users to each control one pointer 1008, 1010 over wireless links 1016, 1018. The wireless links 1016, 1018 may be separate links or they may share the same link (e.g., a single BLUETOOTH channel). Two ring computing devices 1012, 1014 may also control UI elements on a single window by a single user (e.g. multi-device control video games).

Attention is now directed towards embodiments of user interfaces ("UIs") that are, optionally, implemented on ring computing device 700.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 730 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 700). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 700, or 720 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts)

above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

Figure 11:
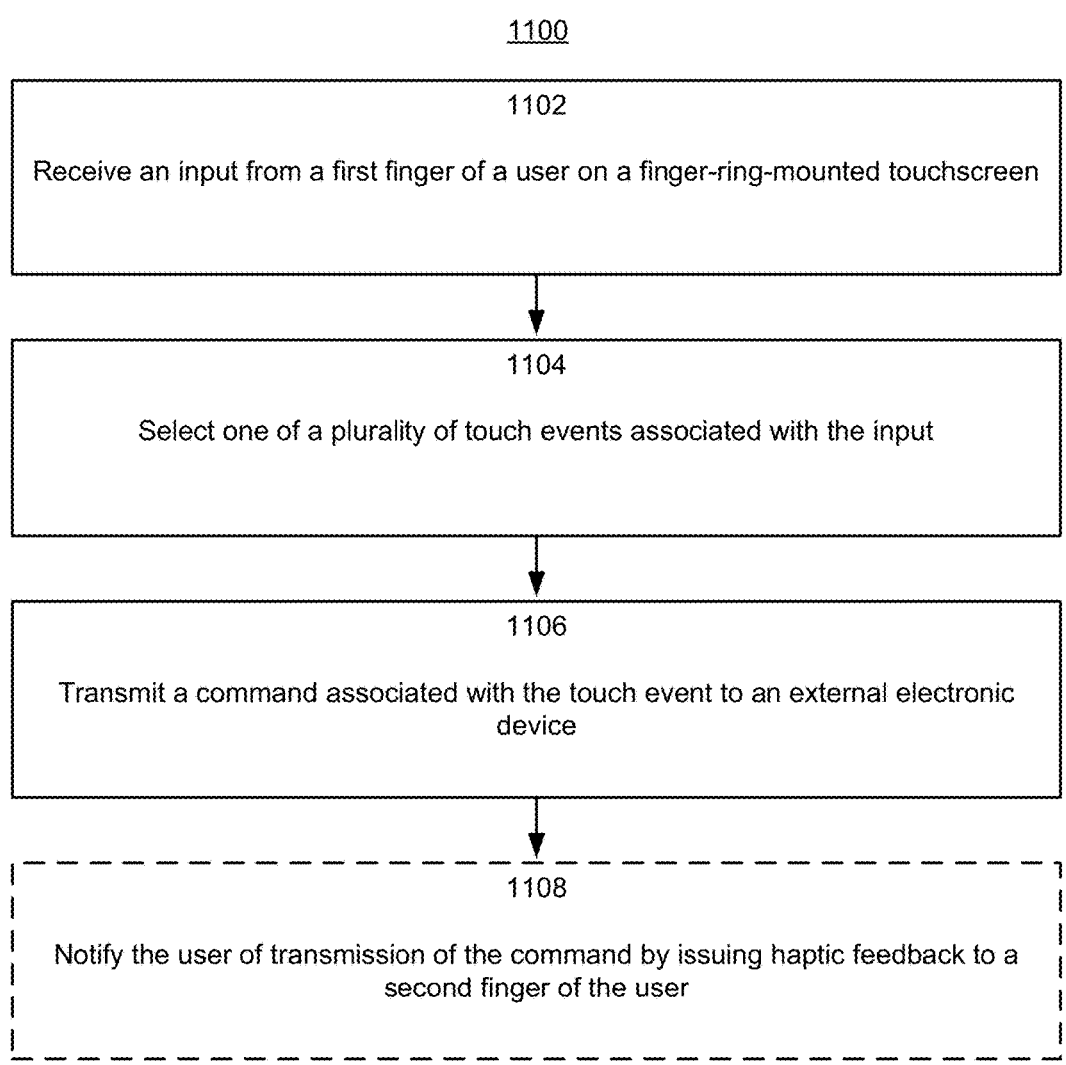
FIGS. 11, 12, and 13 are flow diagrams illustrating a method of using a ring computing device in accordance with some embodiments.

FIG. 11 is a flowchart 1100 of a method for controlling an external electronic device in accordance with embodiments of the present invention. Initially, input is received (1102) from a first finger (e.g., an index finger (624)) of a user on a finger-ring-mounted touchscreen (worn on a second finger, e.g., a thumb (626)). One of a plurality of touch events associated with the input is then selected (1104). A command associated with the touch event is transmitted (1106) to an external electronic device. Each of these steps, and other embodiments, are described in greater detail below.

A touch, gesture, or other such event is recognized (1102) by the touch-sensitive display or pad system (712) when the user's first finger makes physical contact with (or comes near to) the touch screen or pad (110). The display controller (756), using the processor (722) processes the input and recognize the x,y position, duration, and/or pressure of the contact and translates the contact into a computer-readable form. In some embodiments, data corresponding to the contact is stored in the memory (702).

A contact/motion module (730) may select (1104) one of a plurality of touch events based on the input. The input may be, for example, a tap, double-tap, glide, trace, character, or any other such input. In some embodiments, the input is compared to a library of recognized inputs. If the input is not recognized, the contact/motion module (730) may report an error and/or ignore the input.

A command associated with the touch event is transmitted (1106) to an external electronic device. Alternatively or in addition, the input and/or the touch event is sent to the external electronic device for selection of the touch event or execution thereon; the command may be executed locally on the ring computing device (902). The command may be, for example, a mouse, cursor, or pointer movement, a volume control, a lighting control, or other such command. In other embodiments, the touch event itself is transmitted to the external electronic device (904), which associates the command therewith.

In some embodiments, the user is notified of transmission of the command (1108) or local execution of the command by issuing haptic feedback via haptic actuator to the finger of the user bearing the ring. The haptic feedback may be, for example, a vibration or pulse. In other embodiments, the notification is an audio one; in still other embodiments, no notification is given. In other embodiments audio, visual, and/or haptic feedback is provided to the user.

Figure 12:
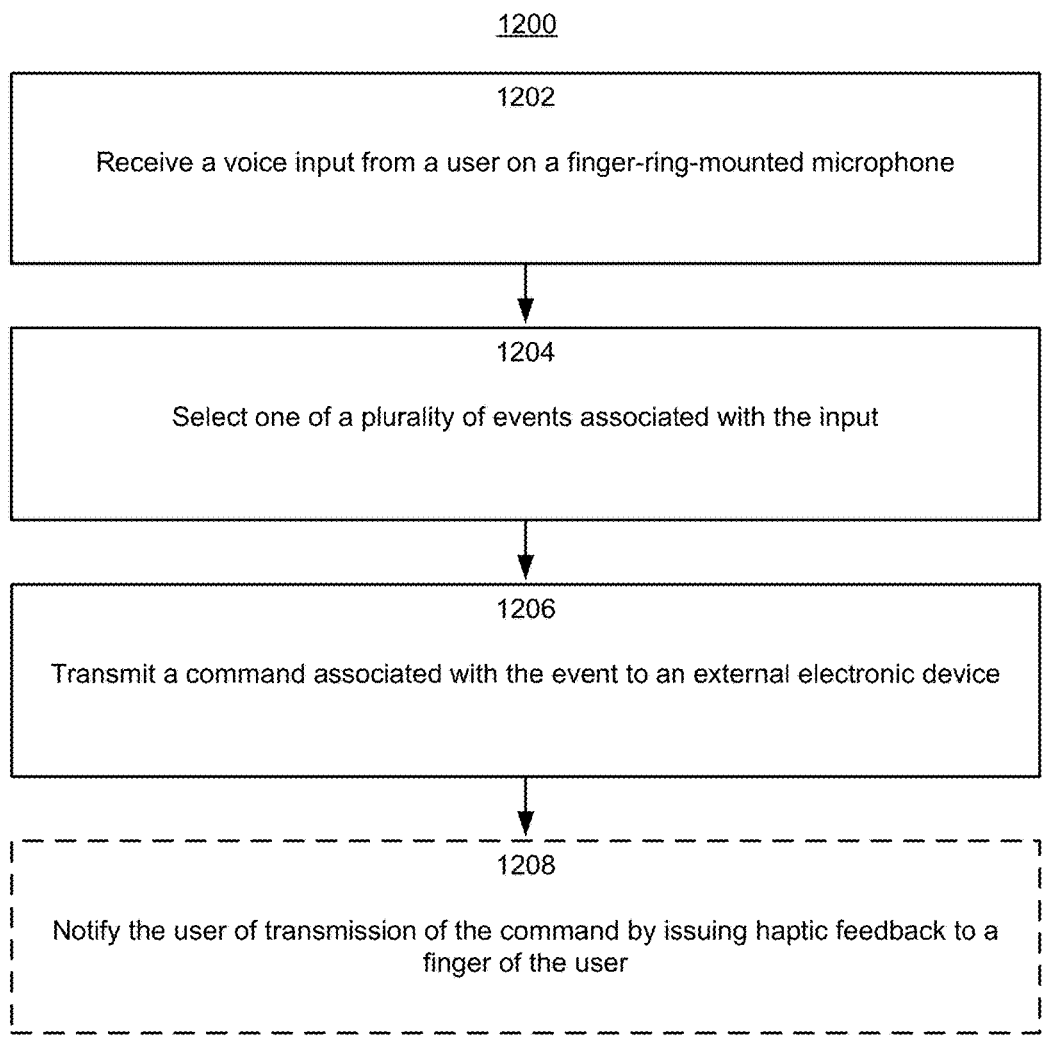

FIG. 12 is a flowchart 1200 of a method for controlling an external electronic device in accordance with embodiments of the present invention. Initially, a voice-command input of a user is received (1202) on a finger-ring-mounted microphone. One of a plurality of events associated with the input is then selected (1204). A command associated with the event is transmitted (1206) to an external electronic device or executed locally on the ring computing device. Finally, the user may be notified (1208) of transmission of the command or the local execution of the command via haptic, visual, and/or audio feedback.

Figure 13:
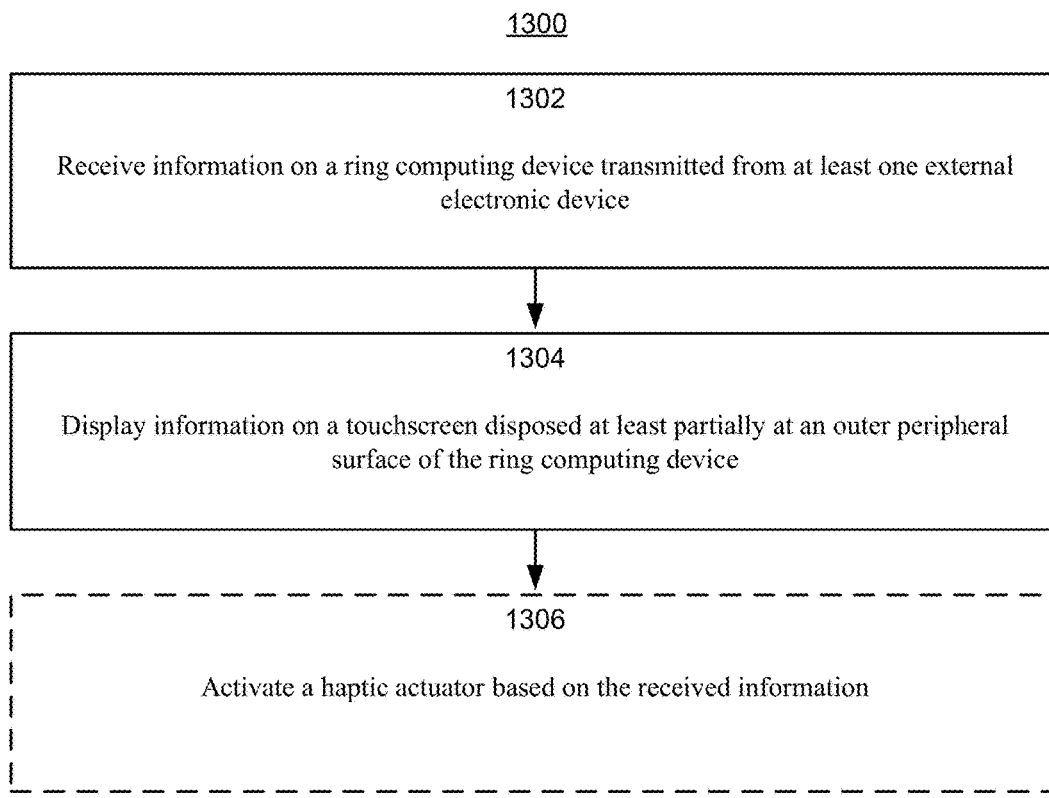

FIG. 13 is a flowchart 1300 of a method for controlling an external electronic device in accordance with embodiments of the present invention. Information transmitted from at least one external electronic device is received (1302) on a ring computing device. The information is displayed (1304) on a touchscreen disposed at least partially at an outer peripheral surface of the ring computing device. In some embodiments, a haptic actuator is activated (1306) based on the received information.

In some embodiments, the input corresponds to a letter, number, character, or other symbol that the user wishes to select or draw. The touchscreen (110) may display some or all of a set of available letters, numbers, characters, or other symbols; in some embodiments, the touchscreen (110) displays some or all of a QWERTY keyboard. The user may then select a desired input by touching the portion of the on-screen keyboard corresponding to the desired input. In some embodiments, the user may zoom in or out on the keyboard by entering a command (e.g., a pinch-in, pinch-out, a double-tap gesture, a rotation of the dial control, etc.). The user may further drag a zoomed-in view to display other portions of the QWERTY keyboard on the touchscreen (110).

In other embodiments, the input corresponds to a desired movement of pointer, cursor, or other such indicator displayed on an external electronic device (904) linked to the ring computing device (902), which further displays a plurality of letters, numbers, characters, or other symbols beneath the pointer. The user may navigate to a desired key on a QWERTY keyboard displayed on the external electronic device (904) with the touch screen or pad on the ring computing device (902) with, e.g., gliding gestures and then select the desired input with, e.g., a tap gesture. In other embodiments, the user touches and moves his or finger across the touchscreen or pad to correspondingly move the cursor on the screen of the external electronic device; characters are highlighted as the cursor rolls over the character. The user may move the cursor by gesturing and holding his or her finger at an edge of the touch screen or pad, as described below. The character pointed by the cursor is chosen (and further highlighted) when the user lifts his or her finger. In other embodiments, as the user chooses characters, the external display shows options for completing the desired word. The user selects one of the autocomplete words via any of the character-selection methods described above. The autocomplete words may also be shown on the ring touchscreen.

In either embodiment, whether the keys are displayed on the ring computing device (902) or on the external electronic device 904, the input may correspond to desired words instead of individual characters. For example, the user may input a desired word by tapping a first character of the word and then gliding or swiping his or her finger without lifting it to portions of the touch screen or pad corresponding to second, third, and subsequent characters of the word, finally lifting his or her finger when all the characters in the word have been entered. In another embodiment, the user glides or swipes his or her finger without lifting it to portions of the touch screen or pad corresponding to the first character of the word and holds the finger until the character is selected (i.e. the character is highlighted in a particular way to indicate selection); and then continuing the gesture of gliding/swiping without lifting and holding the finger to select a second, third, and subsequent characters of the word, finally lifting his or her finger when all the characters in the word have been entered. Software on the ring computing device (902) and/or the external electronic device (904) may thereafter calculate the intended word by comparing the x,y positions of the indicated letters to a database of known words and corresponding x,y positions.

In some embodiments, the user may input characters by drawing them on the touch screen or touch pad (110). For example, if the user wishes to input an "I" character, the user would make a gesture of a vertical line on the touch screen or touch pad (110). Similar gestures may be made for other characters. In other embodiments, a simplified set of symbols or characters may be used in lieu of or in addition to the actual characters.

In some embodiments, particularly when the user wishes to make a large movement of an on-screen pointer, volume, scroll list, or other such user interface element, the user would normally have to make a plurality of repeat gestures on the touch screen or touch pad (110) in order to accomplish the movement. Instead, the user may make one gesture from an interior portion of the touch screen or touch pad (110) (i.e., a point distal to the border of the touch screen or touch pad (110) and the outer periphery surface (106)) to the border and then hold his or her finger at the border. The ring computing device (902) may thus recognize this gesture as an input from the user corresponding to a touch event interpreted as a continuous gesture in a certain direction.

In some embodiments, the power system (762) of the ring computing device (902) includes a port, such as a micro-USB port, for wired charging. In other embodiments, the power system (762) of the ring computing device (902) receives power from a wireless power source. The wireless power source may be a mat or pad upon which the user may place the ring computing device (902) when the user is not wearing it; the user may alternatively continue to wear the ring computing device (902) and place it on or near the pad. In other embodiments, the wireless power source may be a wall-mounted hook or stud having a diameter smaller than that of the aperture (104) of the ring computing device (902); the user may remove the ring computing device (902) from his or her finger and place it on the hook or stud for charging.

Figure 14:
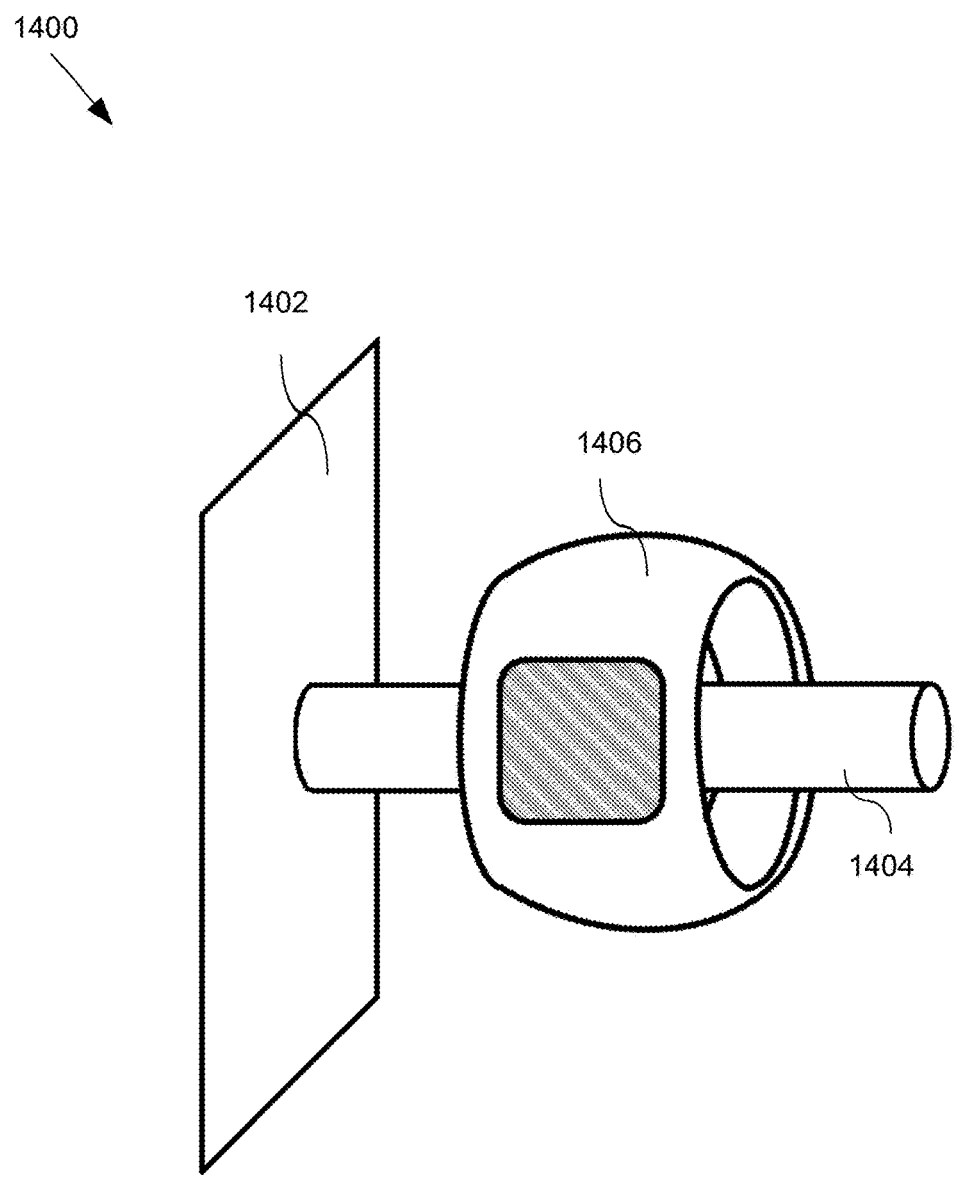
FIG. 14 illustrates a wall-mounted wireless charging hook or stud for a ring computing device in accordance with some embodiments.

FIG. 14 illustrates a system 1400 that includes a support member 1402, a hook or stud 1404 attached thereto, and ring 1406 disposed on the hook or stud 1404. In some embodiments, the hook or stud 1404 includes circuitry for wirelessly broadcasting power to the ring 1406, and the power is supplied by AC mains behind the wall 1402. In some embodiments, the support member 1402 is a wall, automobile dashboard, appliance, item of furniture, or other such object; in other embodiments, the support member 1402 is attached to one of said objects. In other embodiments, the ring 1406 attaches to or is held in place near the support member 1402 by a magnet inside or attached to the support member 1402 and/or a magnet in the ring 1406 in addition to or instead of the post or stud 1404; in these embodiments, the wireless power broadcasting circuitry is disposed in or attached to the support member 1402. In other embodiments, the ring power recharge unit is wired to a wall power plug and is placed at a convenient location (such as a television table or coffee table). Multiple pluggable hooks or studs may plug to the same power recharge unit, allowing recharging of multiple rings at the same time while using one single power unit. In other embodiments, the wireless power source is incorporated or integrated into an object or item upon which the user would place his or her hands on, or hold, for performing some other task, such as the steering wheel of a car, a computer mouse, a glove, etc.

Figure 15:
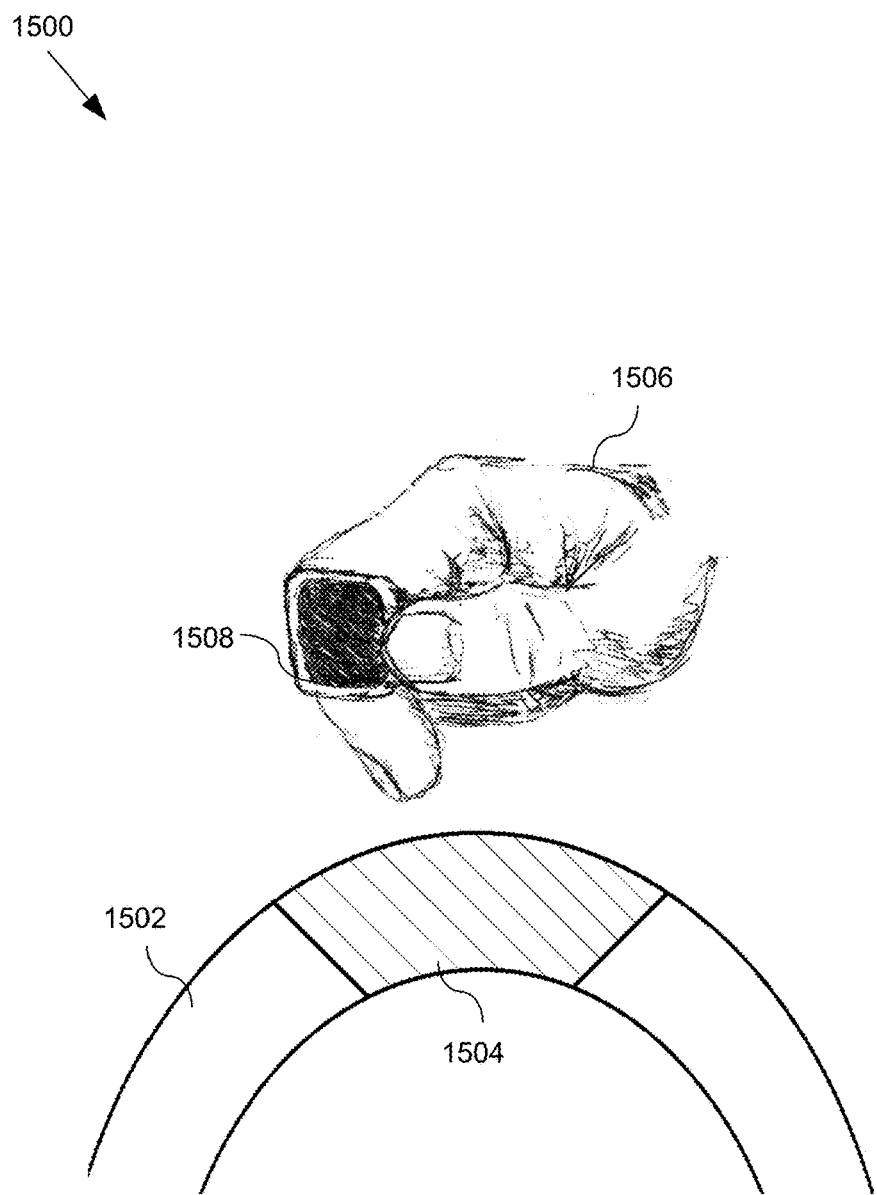
FIG. 15 illustrates steering-wheel-mounted wireless charger for a ring computing device in accordance with some embodiments.

FIG. 15 illustrates a system 1500 that includes an automobile steering wheel 1502 that includes a wireless power broadcasting unit 1504; when the user's hand 1506 is used to operate the steering wheel 1502, the unit 1504 broadcasts power to the ring 1508 and thereby charges the battery within. In other embodiments, the embodiments shown in FIGS. 14 and 15 provide power to the rings 1406 and 1508 through a wired connection. In some embodiments, a wired charger is used instead of or in addition to the wireless charger.

In some embodiments, the ring computing device (902) includes a near-field communication (NFC) initiator (i.e., an active scanner) and/or target (i.e., a passive tag); other types of similar systems, such as radio-frequency identification scanners and/or readers, as well as two-way systems such as BLUETOOTH or WI-FI, etc. are within the scope of the present invention. In some embodiments, the NFC device is used to interact with, change the state of, unlock, or otherwise affect one or more external electronic devices (904). The external electronic device (904) need not be already paired or otherwise in wireless communication with the ring computing device (902) via, e.g., BLUETOOTH or WI-FI. For example, a user of a ring computing device (902) may bring an external electronic device out of a sleep or standby state by bringing the ring computing device (902) into physical proximity therewith and/or by holding or picking up the external electronic device (904).

In some embodiments, the external electronic device (904) reacts only if the NFC identification information in the ring (902) matches known identification information in or accessible to the external electronic device (904). The user may provide this information to the external electronic device (904) via direct input thereto, using the ring computing device (902), or by using another external electronic device (904). For example, the user may bring a cellular telephone out of a sleep state, turn on its screen, activate its voice-recognition system, or unlock its screen by picking up the phone with the hand bearing the ring computing device (902) when an NFC initiator on the phone senses the NFC tag on the ring computing device and recognizes its NFC identification information. In some embodiments, the sensing of the ring (902) may save power over prior art devices that use an accelerometer to detect an initiation of an interaction with an external device, such as a cellular telephone. For example, in some prior art systems, an accelerometer must be consistently powered to "listen" for events indicating that a user is initiating an interaction with the device, such as lifting the device from a resting position. As will be appreciated, by detecting NFC proximity with ring (902), a device can power up the accelerometer only as the ring (902) is detected in proximity with the device—thus saving power. In other embodiments, the user may unlock an NFC-reader-enabled door, keycard scanner, or automobile or turn on a light, television, or stereo.

In some embodiments, the external electronic device (904) reacts differently when different NFC identification information is read from a set of different ring computing devices (902). The different ring computing devices (902) are configured, in various embodiments, to have different levels of authorization, different user profiles, or different privacy settings, and the external electronic device (904) permits different levels of access or control thereto and/or displays different applications, themes, or settings. For example, a cellular telephone may permit full access and control when it senses NFC identification information associated with a ring computing device (902) of a primary user; different customizations, themes, or applications when it senses NFC identification information associated with a ring computing device (902) of a spouse, friend, or co-worker of the user, and limited access and control it when senses NFC identification information associated with a ring computing device (902) of a child of the primary user. In some embodiments, if the external electronic device (904) is active or is activated via a button press, voice command, accelerometer activation, or other means of activation, but does not sense recognized NFC identification information because the authorized ring is not near the external electronic device, it deactivates, does not activate, activates in a guest mode (thereby displaying only limited functionality and/or a guest login prompt), and/or activates but does not display or permit access to personal information of the user (such as, e.g., incoming calls, appointments, or other such notifications).

In some embodiments, the external electronic device (904) changes a state or setting depending on whether it is held or activated by a user's right or left hand. If the user bears only one ring computing device (902) on one hand, for example, external electronic device (904) distinguishes between hands based on whether it senses the NFC identification information. Similarly, if the user bears a ring computing device on each hand, the external electronic device (904) senses the different NFC identification information. The external electronic device (904) may instead or in addition infer which hand is holding it based on a signal strength, orientation, origin, or position of the NFC signal emitted by the ring computing device (902). The external electronic device (904) may, for example, horizontally flip a user interface screen or element in response to left-versus right holding, or change the size or shape of user interface elements in response to detecting that the device is currently being operated single-handedly as opposed to two-hands, or vice versa.

In some embodiments, the external electronic device (904) senses a relative distance between it and the ring computing device (902) by monitoring the signal strength of the NFC emitted thereby; a weaker signal implies a greater distance and a stronger signal implies a smaller distance. The user may use this distance as a control input to the external electronic device (904) and, for example, control the volume of a television by varying it. In other embodiments, the external electronic device (904) includes at least two NFC scanners/initiators and computes an actual distance between it and the ring computing device (902); at least three NFC scanners/initiators permit triangulation of the position of the ring computing device (902). As can be appreciated, using multiple NFC scanners in the external electronic device (904) allows the device to compute directionality of movement of the ring computing device (902) with respect to external electronic device (904)—sensing whether the ring (902) is moving left to right, right to left, closer or farther, and then in response to the sensing performing an associated action, such as page-turning, zooming in or out of an interface, page scrolling, etc.

In other embodiments, the ring computing device (902) includes at least two NFC emitters, one on each side of the ring, and the external electronic device (904) measures a signal emitted from each separately to more accurately measure rotation of a users hand and translate the rotation into an associated input signal on the external electronic device (904). For example, the user may rotate her hand to turn a dial displayed on a screen of the external electronic device (904).

In some embodiments, the user authenticates him or herself to the ring computing device (902) via a username and password, security challenge question, or biometric data; the authentication may be one-time, periodic, or ongoing. The authentication may lapse if the ring computing device (902) senses it has been removed from the user's finger using, e.g., by sensing that there is no longer contact with the user's skin and/or no measured pulse. While authenticated, in some embodiments, the user uses the ring (902) to access secure documents on a shared external electronic device (904) by bringing the ring computing device (902) into proximity with an NFC initiator thereon and thus automatically authenticates him or herself. For examples, doctors in a hospital may be authenticated to and use a plurality of ring computing devices (902) to access partitioned patient data on shared terminals.

In some embodiments, the authenticated ring computing device (902) allows additional transactions or interactions to be facilitated. In a financial transaction, the user's ring (902) is paired with a financial account, such that transactions can be completed merely by bringing the ring within an NFC reader field. For example, if the handle or door of a refrigerator were fitted with an NFC reader, opening the refrigerator with the hand wearing the ring would identify the user to the refrigerator. The user could then be charged for any item withdrawn from the refrigerator through the associated financial account. In a situation where the individual items were also fitted with NFC transmitters, each item removed from the refrigerator could "announce" itself to the refrigerator reader as it was removed so that the user would only be charged for the specific items removed.

NFC communication may similarly be used to share information with other devices, including other ring computing devices (902); two users both wearing ring computing devices (902), for example, may share their contact information by shaking respective hands each bearing a ring (902). The users may configure their devices (902) to share other information, messages, or money. For example, the user may say "by shaking hands with Steve I agree to give him $20," which is recorded and converted to text and/or computer instructions, such that when the user shakes hands with Steve, and the user's ring is detected by an external device or a second ring worn by Steve, $20 is paid to Steve. As will be understood, any digital "right" could be passed between users in a similar manner, such as passing event tickets, music, electronic books, or digital file by indicating to one or both of the ring (902) or external device (904) of the user's intent by shaking another user's hand. As will be appreciated the metaphor of handshaking is non-limiting: the user may bring ring (902) within proximity of another user's NFC reader, whether embodied in another ring (902) or any other external device (904).

In some embodiments, the user establishes a wireless link (908) between the ring computing device (902) and an external electronic device (904) in any one of a variety of different ways. For example, the user may bring a near-field communication device integrated into the ring computing device (902) in close proximity to a corresponding near-field communication device (e.g., a reading device) integrated into the external electronic device (904). The user may instead or in addition touch a surface of the ring computing device (902) to a surface of the external electronic device (904). Once the near-field communication (or similar) devices recognize each other, the wireless link (908) may be established.

In other embodiments, the user may indicate a desire to establish the wireless link (908) by performing a hand gesture. For example, the user may point at the external electronic device (904) using the finger bearing the ring (902). Alternatively or in addition, the user may flick or snap his or her wrist during the pointing gesture and/or point and move his or her finger closer to or farther away from the external electronic device (904). For example, the user may point at a set-top box while wearing the ring and an accelerometer in the ring may associate the pointing motion with a direction towards the set-top box, and thereafter establish a wireless connection with the set-top box. Similarly, the user may switch between paired external electronic devices by pressing a button (306) or rotating the dial control (310).

In some embodiments, the telephone module (738) includes voice-over-IP or similar capabilities, and the wireless link (908) comprises a WI-FI or similar protocol capable of supporting IP traffic. The user may thus initiate or receive telephone calls on the ring computing device (902) using the telephone module (738) and wireless link (908). The user may initiate a telephone call using a voice command, by inputting a telephone number on the ring computing device (902), or by selecting a phone number or contact in a list of phone numbers or contacts displayed on the ring computing device (902). The user may receive an incoming telephone call by tapping or gesturing on the touch screen or pad (110) or by tapping on an area or icon (i.e., a green button) on the touchscreen or by making a hand gesture (e.g., raising the ring computing device (902) to his or her mouth or face). In other embodiments, the ring computing device is used as a more convenient interface to perform basic functions of other devices, e.g., answering an incoming call on the user's cellular telephone, when paired wirelessly to the telephone, without having to reach out for his or her cellular telephone.

In some embodiments, VoIP-related or other, the microphone (410) of the ring computing device (902) may be used to capture quiet speech or sounds of the user when the user presses or brings the microphone near (410) to his or her neck, mouth, or throat. Software on the ring computing device (902) and/or a paired external electronic device (904) may be used to compensate for or filter out any distortion in the speech or sounds caused by capturing them through the neck or throat or in close proximity to the mouth. The user may thus capture quiet speech or sounds in environments in which louder speech or sounds would be difficult to capture, dangerous or inappropriate.

In some embodiments, the ring computing device (902) is used to control a variety of different external electronic devices (904). For example, the external electronic device (904) may be a camera, and the ring computing device (902) may be paired thereto and control (via the wireless link (908) the camera's shutter, zoom, focus, f-stop, or any other control via a tap, gesture, or hand gesture. When paired with a desktop or laptop computer, the ring computing device (902) may be used as a mouse, as a scroll wheel, as a task switcher, for cutting and pasting, or for any other similar task. Such use of the ring computing device (902) may permit the user to perform such functions, normally relegated to computer mice or special keyboard keys, without removing his or her fingers from the home keyboard row, thus increasing productivity. In some embodiments, the ring computing device (902) recognizes a swiping or flicking hand gesture of the user and sends a command to the external electronic device (904) to change input fields in, e.g., a web page input form. Use of the ring computing device (902) as a mouse or similar function may trigger the ring computing device (902) and/or paired computer to disable the computer touch pad to thereby prevent errant gestures made thereto.

In other embodiments, the ring computing device (902) may be paired with an automobile audio system, cruise control system, heating/cooling system, navigation system, or entertainment system and thus permit the user to control said systems without needing to remove his or her hands from the steering wheel, gear shift, or other control. The ring computing device (902) may be similarly paired with active-display eyeglasses, thermostats, or appliances. If paired with a smart watch, the control dial (310) of the ring computing device (902) may be used in lieu of or in conjunction with the crown of the watch to thereby permit one-handed control of the smart watch (i.e., the hand upon which the watch is worn may also be used to control the watch, rather than the user's opposing hand) and/or two-handed control of the watch (i.e., the ring may be used to manipulate the functionality provided by the watch crown and the opposing hand can be used to control the watch). The ring computing device (902) may further be paired with a video game controller or video game system and be used to control a video game or be used in conjunction with a video game controller to control a video game.

In some embodiments, a haptic feedback controller (714) is used to give haptic feedback to the user via a haptic actuator. A single haptic feedback generator may be used to inform the user of completion of an event, sending of a command, recognition of a gesture, receipt of a message, or other such events. A single pulse, for example, may indicate successful completion of an event, while a double pulse or vibration may be used for unsuccessful completion of the event. In some embodiments, two or more haptic feedback generators are used to provide directional feedback to the user; if the user is navigating while driving a car or walking, for example, pulsing a generator located on the right side of the user's finger may indicate a right-hand turn is imminent, for example, and the left side for a left turn.

In some embodiments, haptic feedback allows use of the ring computing device (902) without requiring that the user look at the touch pad or display (110) or other visual feedback element of the ring computing device (902); these embodiments are especially useful for users wishing discretion or for visually impaired users. A user may double-tap the touch pad or display (110), for example, to check to see if he or she has any unread notifications on a paired cellular phone or computer; the ring computing device (902) may issue haptic feedback if a notification is pending and no haptic feedback if not. This feature may allow a user to discreetly check for pending notifications without distracting a conversation partner, for example. Similarly, the user may rapidly tap the touch pad or display (110) many times in quick succession (e.g., ten times) to send an emergency alert or request if he or she feels endangered but does not want to alert a potentially threatening party to said alert or request.

In some embodiments, information is encoded in patterns of haptic-feedback pulses. In some embodiments, the patterns may be pre-established patterns such as Morse code; a short pulse corresponds to a Morse-code dot, for example, and a long pulse corresponds to a Morse-code dash. Any other system of encoding is within the scope of the present invention. In other embodiments, Braille or similar characters are created on the touch pad or touch screen (110) by raising portions of the pad or screen (110). In other embodiments, other forms of feedback are used instead of or in addition to haptic feedback. For example, the speaker (711) may be used to play a sound when information or a command is sent to or received by the ring computing device (902)

In some embodiments, the ring computing device (902) includes one or more biometric sensors (716) and controllers (760). These sensors may be used to collect biometric data of the user, such as heart rate, temperature, motion, cardiac rhythm, perspiration, and galvanic skin response, and this information may be collected and displayed by the ring computing device (902) and/or a paired electronic device so that the user may monitor his or her health, fitness, activity, or caloric energy expended. In some embodiments, the collected biometric data is used to authenticate the user by comparing the collected data against a database of data signatures known for the user. Some or all of the collected biometric data may be shared with other users, personal trainers, health professionals, or other parties. In some embodiments, the ring computing device (902) transmits the pulse of the user to another user also wearing a ring computing device (902), which informs the other user of the first user's pulse via visual (e.g. animation of a heart pumping) or haptic feedback. In some embodiments, the ring computing device (902) includes a fingerprint reader for capturing a fingerprint of the user; in some embodiments, the fingerprint reader is integrated into the touch pad or touch screen (110) or is separate from the touch pad or touch screen (110). In other embodiments, the ring computing device includes environment sensors, such as temperature, pressure, and other sensors.

Collected biometric data may also or instead be used as user input to control an external electronic device (904). A biometric sensor such as a skin-conductivity or pressure sensor may, for example, detect how much the user's bearing finger is extended or curled up by measuring the finger's skin conductivity or pressure. The user may thus issue commands to a remote electronic device my extending or curling up his or her fingers. A fist-making motion on the hand bearing the ring computing device (902), for example, may be recognized as an escape or exit command by the ring computing device (902) and this command may be transmitted to the external electronic device (904). The user may further issue commands by making a first and tensing or pulsing his or her finger muscles to thereby change the finger conductance or pressure, which may be detected by the ring computing device (902).

In some embodiments, the collected biometric data (e.g., heart rate data or fingerprint data) is compared to known data of the user and, if it matches or matches within a tolerance, used to unlock or otherwise provide access to features of the ring computing device (902) that are otherwise locked or inaccessible. In other embodiments, the matched collected biometric data is used to unlock features of an external electronic device (904), such as a computer, tablet, laptop, door, or automobile and/or to authenticate the user for an electronic payment.

In some embodiments, the user wears the ring computing device (902) on the hand that he or she uses for writing on physical paper with a pen or pencil; in these embodiments, the ring computing device (902) is paired with a laptop, desktop, tablet, cellular phone, or similar computer, and sensors in the ring computing device (902) (e.g., accelerometers (767), gyroscopes (768), or similar sensors) detect the motion, acceleration, and/or displacement of the user's hand as he or she writes printed, script, or other characters. The ring computing device (902) may automatically detect whether it is being worn on the user's right or left hand and on which finger thereon, and this information may be used to improve the accuracy of the detection. In some embodiments, the user places the ring computing device (902) in direct contact with a pen or pencil. Software running on either the ring computing device (902) and/or paired external computing device (904) detects the motion of the hand using input from the sensors and computes the characters written by the user. The computed characters may then be sent to an active application executing on the external computing device (904), such as an e-mail program, word-processing program, or transcription programs used by healthcare providers. Other gestures may be detected by the ring computing device (902) to perform other text entry functions, such as cursor navigation, backspace, delete, or cut-and-paste; for example, if the user makes a motion that flicks his or her hand and ring computing device (902) rapidly to the left, the ring computing device (902) may send a backspace command to the word-processing program. The ring computing device (902) may similarly detect lines, shapes, and other non-character gestures made by the user with the pen or pencil and send them to (e.g.) a word-processing program executing on the external computing device (904).

In other embodiments, the ring computing device (902) permits the use of a virtual touchpad. The external electronic device (904) may have only a small touchpad (e.g., a laptop touchpad) or no touchpad at all (e.g., a smart television), making interaction therewith difficult. The ring computing device (902) may capture the motion of the hand of the user as he or she performs gestures on a non-touchpad surface, such as a tabletop, and send information corresponding to the captured motion to a paired external electronic device (904), such as a smart television or laptop, which may move a pointer or similar user interface element as if the user were making the gestures on a touchpad or touchscreen. The user may similarly perform other gestures, such as tapping or double-tapping, on the non-touchpad surface, which are similarly interpreted as if they were performed on a touchpad.

In some embodiments, the ring computing device (902) continually monitors the microphone (410) for voice input from the user and recognizes voice commands when they are spoken by the user. The ring computing device (902) may do so in a low-power mode when it is not otherwise active to conserve power, and the voice command may be prefaced by a keyword or phrase to thereby indicate to the ring computing device (902) that a voice command follows. In other embodiments, the user informs the ring computing device (902) that a voice command is imminent with a gesture, such as tapping the touch pad or screen (404), raising the ring computing device (902) to his or her head or mouth, flicking the hand bearing the ring computing device (902), or with a similar gesture.

In some embodiments, the geographical location of the ring computing device (902) is monitored by one or more external computing devices (904); the location may be determined by the ring computing device (902) itself (via GPS, WI-FI location, or cellular tower location) or inferred by the location of a nearby paired external electronic device. The geographical location may be used to locate the user; this location may be used to change the functionality of the ring computing device (902). For example, if the user is located in his or her home, gesturing on the touch pad or screen (110) may default to controlling the volume of a television or dimming the house lights. If, however, the user is located at his or her work, gesturing on the touch pad or screen (110) may default to performing mouse-like functions on the user's work computer.

The location of the ring computing device (902) may be used to change the state of one or more external electronic devices (904). For example, when a user enters a room, a device paired to the ring computing device (902) may turn on or raise the room lights, temperature, or volume of a media device; when the user leaves a room, the device may lower the lights, temperature, or volume. The user may also or in addition change proximate lights via voice commands captured by the ring computing device (902). The state of one or more external electronic devices (904) may be changed or customized based on which ring, the ring's registered owner, or the user authenticated by using identifying information received from the ring computing device (902) (e.g., a password, serial number, MAC address, biometric information or user voice). For example, if one user enters a bathroom the bathroom television is turned on, while if a second user enters the bathroom, the television is not turned on.

In some embodiments, the user of the ring computing device (902) is authenticated before the paired external electronic device (904) permits a change in its state. For example, the external electronic device (904) may include a list of authenticated members of a household or workplace and may compare identifying information received from the ring computing device (902) (e.g., a password, serial number, MAC address, biometric information, or user voice) to confirm the identity of the user before any state is changed. In other embodiments, the external electronic device (904) further authorizes the user after authentication; some users who are members of a household, for example, may have greater privileges to alter the states of external electronic devices (904) than other users. Users who are parents, for example, may have greater privileges than that of users who are children, and may be permitted greater control of the states of external electronic devices (904).

The location of the ring computing device (902) may further be used to locate the ring if it is lost or misplaced. The user may remotely access the ring computing device (902) via an external electronic device (904) or other device and view the location of the ring computing device (902). In some embodiments, if the ring runs out of power, the external electronic devices (904) maintain the historical data including the last location of the ring before it was no longer detected. In other embodiments, the user may remotely cause the ring computing device (902) to beep, vibrate, or otherwise emit a sound or alert.

In some embodiments, two or more ring computing devices (1012, 1014) are used to control a single external electronic device (1002). The user of a first ring computing device (1012) may use it to control user interface element or function (e.g., a pointer (1008)) in a first window (1004), and a user of a second ring computing device (1012) may use it to control user interface element or function in a second window (1006) on the external electronic device (1002). The two windows (1008, 1010) may display user interfaces from copies of the same application or from different applications. One application may be a video player, for example, while the other may be a web browser. The two ring computing devices (1012, 1014) may use separate electronic links (1016, 1018) to the external electronic device (1002) or share the same link.

In other embodiments, the two or more ring computing devices (1012, 1014) may be used to control the same window (1004) of the external electronic device (1002) or the same external electronic device (904). For example, two users may each control the volume of a smart television or the pointer in an electronic presentation. If the two users issue conflicting commands (e.g., one user attempts to raise the volume while another user simultaneously tries to lower the volume), the two or more ring computing devices (1012, 1014) may issue visual, audio, or haptic feedback to the users informing each of the conflict. In other embodiments, one user has a higher authority level than the other, and that user's commands take precedence over the others.

In some embodiments, a single user bears two or more ring computing devices (1012, 1014). The user may use each ring (1012, 1014) to control a separate external electronic device (904) or a single external electronic device (904). For example, the user may use a first ring (1012) on his or dominant hand to control a computer pointer and a second ring (1014) on his or her dominant hand to control a volume of a smart television or other audio device. When controlling a single external electronic device (904) with two rings (1012, 1014), the user may control different states, attributes, or user interface elements with each ring or, in other embodiments, control different attributes of a single element with each ring. For example, the first ring (1012) may be assigned to x-y motion of a pointer in three-dimensional space, while the second ring (1014) may be assigned to z motion.

In some embodiments, a first user wears or operates a first ring computing device (1012) and a second user wears or operates a second ring computing device (1014). As mentioned above, in some embodiments, the ring computing device (902) transmits the pulse of the user to another user also wearing a ring computing device (902), which informs the other user of the first user's pulse via visual or haptic feedback. In some embodiments, the first user inputs gestures or taps on the first ring computing device (1012); this input is transmitted to the second ring computing device (1014) either directly or indirectly via an external electronic device, and the second user receives corresponding haptic, visual, audio, or other feedback.

The first user enters the message using the first ring computing device (1012) in any of a variety of different ways. If the message includes text, the first user may enter the text directly using any of the character-entry systems and methods described herein. The first user may alternatively or in addition configure the first ring computing device to associate text with a touch pad or touch screen gesture, hand gesture, pattern of tactile inputs, symbol, or other input and thereby transmit the text by performing the gesture, pattern, or symbol. For example, the first user may associate the text "yes" with an upward swipe or by drawing the letter "Y" and the text "no" with a downward swipe or by drawing the letter "N." In other embodiments, the first user similarly associates an audio, visual, or haptic message with a gesture, pattern, or symbol.

In some embodiments, the first or second user similarly associates a display pattern, audio pattern, and/or haptic feedback pattern to execute or display on the second ring computing device (1014) when the message is received. The second user may override a display pattern, audio pattern, and/or haptic feedback pattern selected by the first user for a different type, duration, or style of message; for example, the second user may prefer visual feedback in lieu of haptic feedback, or vice versa, and specify that (for example) haptic feedback pulse be converted to audio beeps or visual dots.

For example, the first user taps five times or draws the number "5" on the touch pad or screen, and the second user receives five pulses and/or views the number "5" on the touchscreen, indicating, for example, that the first user is five minutes late, a fifth goal of a viewed sports game has occurred, or other similar meaning. In some embodiments, the touchscreen displays a meaning or intent behind a particular pattern of haptic-feedback pulses as defined by the first user; the second user learns the intent behind the pattern by viewing the touchscreen upon the first receipt thereof. The second user may thus not need to view the touchscreen upon subsequent receipts of the haptic-feedback pattern.

In some embodiments, the first and second ring computing devices (1012, 1014) are paired when the first user sends the message. The pairing occurs continually when the devices are powered on, only when the first and second users are in close geographic proximity, only during certain times of the day, or at any other time. The first user may send a request to the second user requesting a pairing, and the second user may accept or reject the request. In some embodiments, the second user may not reject the request (if, for example, the second user is a subordinate or child of the first user). The first user may send the message to any number of other users.

In some embodiments, the user may install and execute ring-specific applications on the ring computing device (902) (e.g. phone, email, messages, health, weather, pay, traffic, or music applications). The ring-specific applications may be downloaded via the external electronic devices connected to the ring, via a direct Internet connection to a ring applications store or ring applications website, or through other means. The ring applications may use any of the ring computing device input/output devices such as the touchscreen, buttons, sensors, microphone, speakers, haptic actuators, and other components for interacting with the user. The ring apps may operate using local data that can be synchronized with and through the external electronic devices, such as other personal devices owned by the user that contain user personal data (e.g., list of contacts, photos, music playlists, emails, messages, previous locations of the user, or biometrical data).

In some embodiments, the ring computing device (902) includes one or more photo and/or video cameras. In some embodiments, the camera (210) is centered on top of the ring above the touchscreen or pad (i.e. on a top position of the user's finger when the palm of the user's hand is facing down as illustrated in FIG. 2). This position allows for easy pointing of the camera towards the desired shot by parallel aligning and rotating the finger. The camera shutter can be activated by quick gesture like tap or single tap or by pushing one of the buttons or crown dial. The combination of always available ring camera, with easy of positioning and quick camera shutter allows for quick shots, capturing spontaneous human behaviors, right on time nature shots, etc. These camera shots have also the advantage of being less intrusive and not distracting, disturbing or interfering with the scene or environment, as opposed to what often happens when photographers prepare and point cameras at people and even animals.

Figure 16:
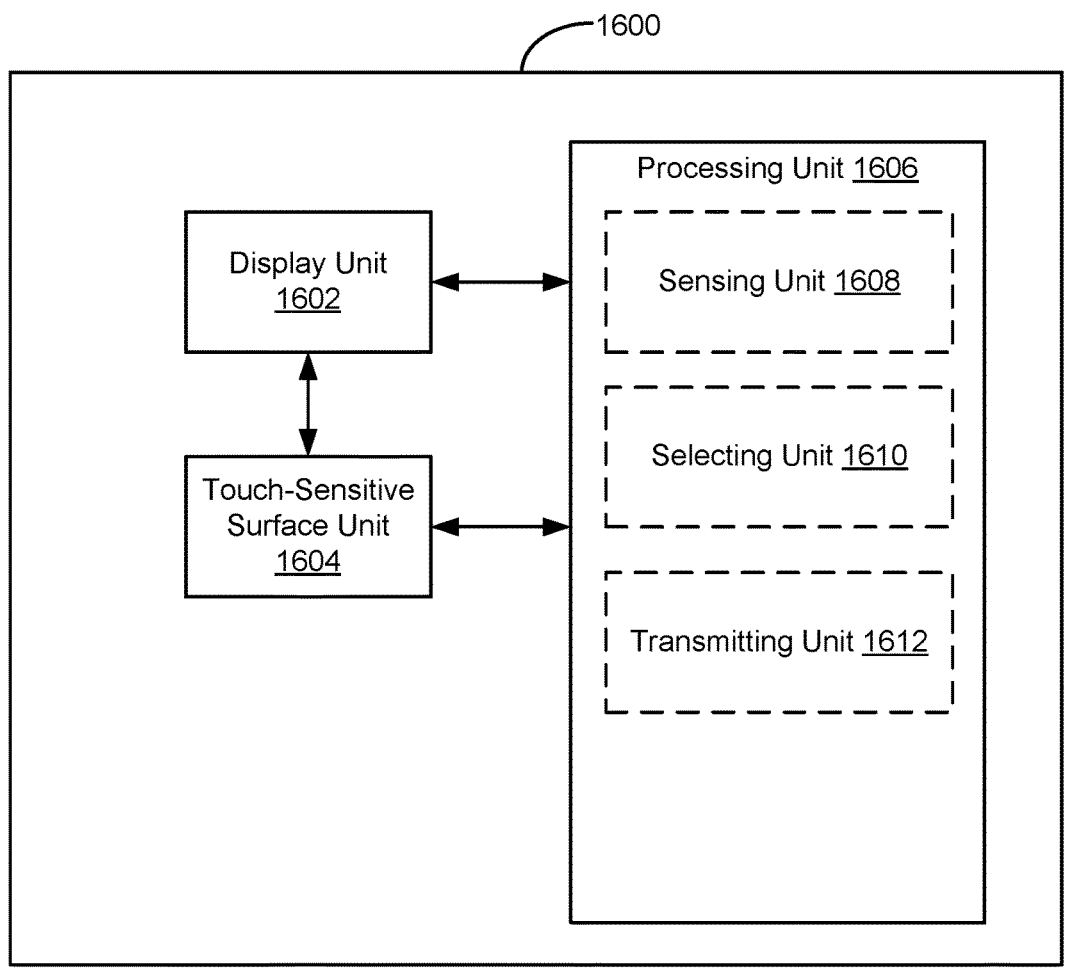
FIG. 16 is a functional block diagram of an electronic device in accordance with some embodiments.

In accordance with some embodiments, FIG. 16 shows a functional block diagram of an electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display a user interface, a touch-sensitive surface unit 1604 configured to receive contacts, and a processing unit 1606 coupled with the display unit 1602 and the touch-sensitive surface unit 1604. In some embodiments, the processing unit 1606 includes: a sensing unit 1608, a selecting unit 1610, and a transmitting unit 1612.

The processing unit 1610 is configured to receive input from a first finger of a user on a finger-ring-mounted touchscreen (e.g., with the sensing unit 1608), select touch events associated with the input (e.g., with the selecting unit 1610), and transmit a command associated with the touch event to an external electronic device (e.g., with the transmitting unit 1612).

The operations in the information processing methods described above are, optionally implemented by running one or more functional modules in information processing apparatus such as general purpose processors or application specific chips.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A wearable ring device comprising:
   an annular member defining an aperture therethrough that is sized for receipt therein of a first finger of a hand of a user;
   a computer processor housed in the annular member;
   a wireless transceiver electrically connected to the computer processor and configured to communicate with at least one external electronic device;
   a rechargeable power source for supplying power to the wireless transceiver and computer processor; and
   a microphone electrically connected to the computer processor;
   wherein
   the wireless transceiver is configured such that a first predefined hand gesture performed using the ring device causes an action to be performed on the external electronic device,
   wherein the first predefined hand gesture includes movement of the ring device, and the action performed on the external electronic device includes changing a variable input to the external electronic device at least partially based on a distance of the ring device relative to the external electronic device.

2. The device of claim 1, further comprising a haptic actuator for identifying recognition of a command to the user.

3. The device of claim 2, further comprising a second haptic actuator, wherein the haptic actuator and second haptic actuator are configured for conveying directional information to the user.

4. The device of claim 1, further comprising a dial control disposed on the ring device, the dial control having a circumference that is perpendicular to a circumference of the ring device, wherein the dial control is configured for receiving input from the user.

5. The device of claim 1, further comprising a wireless power receiver circuit for recharging the power source from a wireless power source.

6. The device of claim 1, further comprising a motion sensor for sensing a writing motion made by the user using the hand with the first finger, wherein the wireless transceiver is configured to transmit information to the at least one external electronic device related to characters written by the user.

7. The device of claim 1, further comprising a biometric sensor for sensing biometric information of the user.

8. The device of claim 1, wherein the wireless transceiver includes a near-field-communication tag configured to transmit identification information of the user to the external electronic device.

9. The device of claim 1, wherein, when the ring device is brought into proximity with the external electronic device, the wireless transceiver is configured to transmit identification information to bring the external electronic device out of a sleep state and into an active state.

10. The device of claim 1, wherein, when the ring device is brought into proximity with the external electronic device, the wireless transceiver is configured to transmit identification information to unlock the external electronic device.

11. The device of claim 1, wherein the wireless transceiver is configured such that a second predefined hand gesture that includes pointing at the external electronic device with the first finger while the ring device is worn on the first finger causes a wireless link to be established between the external electronic device and the ring device.

12. The device of claim 1, wherein the wireless transceiver is configured such that a second predefined hand gesture that includes a swiping or flicking gesture performed using the ring device changes a selection of a first input field to a selection of a second input field on the external electronic device.

13. The device of claim 1, wherein the wireless transceiver is configured such that a second predefined hand gesture that includes movement of the ring device switches from displaying a first page to displaying a second page on the external electronic device.

14. The device of claim 1, wherein the distance of the ring device relative to the external electronic device is determined based on a strength of one or more signals received by the external electronic device from the wireless transceiver.

15. The device of claim 1, wherein the wireless transceiver is configured such that a second predefined hand gesture that includes movement of the ring device causes a second action to be performed on the external electronic device based on a position of the ring device relative to the external electronic device, determined based on triangulation of one or more signals received by the external electronic device from the wireless transceiver using a plurality of wireless receivers at the external electronic device.

16. The device of claim 1, wherein the wireless transceiver is configured such that a second predefined hand gesture that includes rotation of the ring device causes a second action to be performed on the external electronic device based on the rotation of the ring device.

17. The device of claim 1, wherein the wireless transceiver is configured such that a second predefined hand gesture that includes rotation of the ring device in a first direction causes a second action to be performed on the external electronic device based on the first direction of rotation of the ring device.

18. The device of claim 1, wherein the wireless transceiver is configured to transmit separate signals from two opposing sides of the ring device, wherein the separate signals are detected by the external electronic device to measure rotation of the ring device that is used as an input at the external electronic device.

19. The device of claim 1, further comprising an haptic actuator, wherein the haptic actuator is configured, in response to a double tap input on a touch-sensitive surface of the ring device, to provide haptic feedback to the first finger of the user when one or more unread notifications are pending on the external electronic device.

20. The device of claim 1, wherein the wireless transceiver is configured to transmit one or more control signals to a first user interface of a first application displayed in a first window on the external electronic device, distinct from a second user interface of a second application displayed in a second window on the external electronic device and controlled by a second ring device.

21. The device of claim 6, wherein the wireless transceiver is configured, in response to a hand gesture performed using the first finger after the writing motion, to transmit a text manipulation command to the external electronic device, wherein the text manipulation command is movement of a cursor, backspace, delete, or cut-and-paste.

22. A method for controlling a remote electronic device using a finger-ring-mounted touchscreen, the method comprising:
in response to a first predefined hand gesture performed using a ring device disposed on a first finger of a hand of a user, wirelessly causing an action to be performed on an external electronic device, wherein the first predefined hand gesture includes movement of the ring device, and causing the action to be performed on the external electronic device includes changing a variable input to the external electronic device at least partially based on a distance of the ring device relative to the external electronic device;
receiving, on a touchscreen electrically connected to a computer processor and disposed at least partially at an outer peripheral surface of the ring device, input from a second finger of the user;
selecting, using the computer processor, one of a plurality of touch events associated with the input; and
wirelessly transmitting a command associated with the touch event to at least the external electronic device.

23. The method of claim 22, further comprising notifying the user of transmission of the command by issuing haptic feedback to the first finger of the user.

24. The method of claim 22, wherein selecting the one of the plurality of touch events comprises recognizing a touch gesture made by the user that is associated with the command.

25. The method of claim 24, wherein the user is a first user, wherein the external electronic device is a second finger-ring-mounted device, and wherein the transmitted command causes the second finger-ring-mounted device to issue feedback corresponding to a message of the first user to a second user.

26. The method of claim 25, wherein the first user specifies the feedback issued to the second user by the second finger-ring-mounted device in accordance with the transmitted command.

27. The method of claim 22, further comprising:
receiving, using a microphone of the ring device, a voice input of the user; and
transmitting the voice input to the external electronic device.

28. The method of claim 22, further comprising establishing a wireless link with the external electronic device in response to a hand gesture by the user.

29. The method of claim 28, wherein the hand gesture comprises pointing at the external electronic device with the first finger.

30. The method of claim 22, further comprising detecting handwriting of the user using a motion sensor electrically connected to the computer processor and transmitting the detected handwriting to the external electronic device.

31. The method of claim 22, wherein the input is a character drawn by the user on the touchscreen.

32. The method of claim 22, wherein the external electronic device further receives commands from at least one other finger-ring-mounted touchscreen.

33. The method of claim 22, including transmitting identification information to the external electronic device in response to bringing a near-field communication device electrically connected to the computer processor into proximity with the external electronic device.

34. The method of claim 22, including transmitting identification information to bring the external electronic device out of a sleep state and into an active state.

35. A method for displaying information using a ring computing device worn on a first finger of a hand of a user, the method comprising:
in response to a first predefined hand gesture performed using the ring computing device, transmitting, via a wireless transceiver electrically connected to a computer processor housed in the ring computing device, data representative of the hand gesture to an external electronic device to cause an action to be performed on the external electronic device, wherein the first predefined hand gesture includes movement of the ring computing device, and causing the action to be performed on the external electronic device includes changing a variable input to the external electronic device at least partially based on a distance of the ring computing device relative to the external electronic device.

36. The method of claim 35, including transmitting identification information to the external electronic device in response to bringing a near-field communication device electrically connected to the computer processor into proximity with the external electronic device.

37. The method of claim 35, including transmitting identification information to bring the external electronic device out of a sleep state and into an active state.

38. The method of claim 35, wherein the ring computing device further comprises a haptic actuator, and the method includes identifying recognition of a command to the user via the haptic actuator.

39. The method of claim 38, wherein the ring computing device further comprises a second haptic actuator, and the method includes conveying directional information to the user via the haptic actuator and second haptic actuator.

40. The method of claim 35, wherein the ring computing device further comprises a dial control disposed on the ring computing device, the dial control having a circumference that is perpendicular to a circumference of the ring computing device, and the method includes receiving input from the user via the dial control.

41. The method of claim 35, wherein the ring computing device further comprises a rechargeable power source for supplying power to the wireless transceiver and computer processor, and a wireless power receiver circuit, and the method includes recharging the rechargeable power source from a wireless power source via the wireless power receiver circuit.

42. The method of claim 35, wherein the ring computing device further comprises a motion sensor, and the method includes sensing, via the motion sensor, a writing motion made by the user using the hand with the first finger, wherein the wireless transceiver is configured to transmit information to the external electronic device related to characters written by the user.

43. The method of claim 42, including, in response to a hand gesture performed using the first finger after the writing motion, transmitting, via the wireless transceiver, a text manipulation command to the external electronic device, wherein the text manipulation command is movement of a cursor, backspace, delete, or cut-and-paste.

44. The method of claim 35, wherein the ring computing device further comprises a biometric sensor, and the method includes sensing biometric information of the user via the biometric sensor.

45. The method of claim 35, including, when the ring computing device is brought into proximity with the external electronic device, transmitting, via the wireless transceiver, identification information to bring the external electronic device out of a sleep state and into an active state.

46. The method of claim 35, including, when the ring computing device is brought into proximity with the external electronic device, transmitting, via the wireless transceiver, identification information to unlock the external electronic device.

47. The method of claim 35, including, in response to a second predefined hand gesture that includes pointing at the external electronic device with the first finger while the ring computing device is worn on the first finger, establishing a wireless link between the external electronic device and the ring computing device.

48. The method of claim 35, including, in response to a second predefined hand gesture that includes a swiping or flicking gesture performed using the ring computing device, changing a selection of a first input field to a selection of a second input field on the external electronic device.

49. The method of claim 35, including, in response to a second predefined hand gesture that includes movement of the ring device, switching from displaying a first page to displaying a second page on the external electronic device.

50. The method of claim 35, wherein the distance of the ring computing device relative to the external electronic device is determined based on a strength of one or more signals received by the external electronic device from the wireless transceiver.

51. The method of claim 35, including, in response to a second predefined hand gesture that includes movement of the ring computing device, performing a second action on the external electronic device based on a position of the ring computing device relative to the external electronic device, determined based on triangulation of one or more signals received by the external electronic device from the wireless transceiver using a plurality of wireless receivers at the external electronic device.

52. The method of claim 35, including, in response to a second predefined hand gesture that includes rotation of the ring computing device, performing a second action on the external electronic device based on the rotation of the ring computing device.

53. The method of claim 35, including, in response to a second predefined hand gesture that includes rotation of the ring computing device in a first direction, performing a second action on the external electronic device based on the first direction of rotation of the ring computing device.

54. The method of claim 35, including transmitting, via the wireless transceiver, separate signals from two opposing sides of the ring computing device, wherein the separate signals are detected by the external electronic device to measure rotation of the ring computing device that is used as an input at the external electronic device.

55. The method of claim 35, wherein the ring computing device further comprises an haptic actuator, and the method includes, in response to a double tap input on a touch-sensitive surface of the ring computing device, to provide, via the haptic actuator, haptic feedback to the first finger of the user when one or more unread notifications are pending on the external electronic device.

56. The method of claim 35, including transmitting, via the wireless transceiver, one or more control signals to a first user interface of a first application displayed in a first window on the external electronic device, distinct from a second user interface of a second application displayed in a second window on the external electronic device and controlled by a second ring computing device.

57. A wearable ring device comprising:
an annular member defining an aperture therethrough that is sized for receipt therein of a first finger of a hand of a user;
a computer processor housed in the annular member;
a wireless transceiver electrically connected to the computer processor and configured to communicate with at least one external electronic device; and
a rechargeable power source for supplying power to the wireless transceiver and computer processor;
wherein the wireless transceiver is configured to transmit separate signals from two opposing sides of the ring device, wherein the separate signals are detected by the external electronic device to measure rotation of the ring device that is used as an input at the external electronic device.

58. A method for controlling a remote electronic device using a ring computing device worn on a first finger of a hand of a user, the method comprising:
in response to a first predefined hand gesture performed using the ring computing device, transmitting, via a wireless transceiver electrically connected to a computer processor housed in the ring computing device, separate signals from two opposing sides of the ring device, wherein the separate signals are detected by an external electronic device to measure rotation of the ring device that is used as an input at the external electronic device.

* * * * *